(12) United States Patent
Younessian et al.

(10) Patent No.: US 11,617,012 B2
(45) Date of Patent: *****Mar. 28, 2023

(54) SYSTEMS AND METHODS FOR IMPROVED CONTENT ACCESSIBILITY SCORING

(71) Applicant: Comcast Cable Communications, LLC, Philadelphia, PA (US)

(72) Inventors: Ehsan Younessian, Washington, DC (US); Faisal Ishtiaq, Plainfield, IL (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,611

(22) Filed: Apr. 29, 2022

(65) Prior Publication Data

US 2022/0264181 A1    Aug. 18, 2022

Related U.S. Application Data

(63) Continuation of application No. 17/004,992, filed on Aug. 27, 2020, now Pat. No. 11,350,166.

(51) Int. Cl.
*H04N 21/482* (2011.01)
*H04N 21/466* (2011.01)
(Continued)

(52) U.S. Cl.
CPC ....... *H04N 21/4662* (2013.01); *H04N 21/435* (2013.01); *H04N 21/4316* (2013.01);
(Continued)

(58) Field of Classification Search
None
See application file for complete search history.

(56) References Cited

U.S. PATENT DOCUMENTS 5,121,467 A    6/1992 Skeirik
5,226,092 A    7/1993 Chen
(Continued)

FOREIGN PATENT DOCUMENTS

WO    2019193547 A1    10/2019

OTHER PUBLICATIONS

Kalamaras, et al., "Accessibility-based reranking in multimedia search engines," Multimed Tools Appl (2017 (27 pages).
(Continued)

*Primary Examiner* — William J Kim
(74) *Attorney, Agent, or Firm* — Ballard Sparh LLP

(57) ABSTRACT

Provided herein are methods and systems for improved accessibility scoring for content items. A predicted accessibility score may be based on a plurality of multimodal features present within a content item. The plurality of multimodal features may include video features (e.g., based on video/image analysis), audio features (e.g., based on audio analysis), text-based features (e.g., based on closed-captioning analysis), features indicated by metadata (e.g., duration, genre, etc.), a combination thereof, and/or the like. A predicted accessibility score for a content item may indicate how accessible the content item may be for persons who are visually impaired, hearing impaired, cognitively impaired, etc., as well as for persons who desire to view content that requires less visual attention and/or audio attention as the case may be.

24 Claims, 14 Drawing Sheets

(51) Int. Cl.
    *H04N 21/431* (2011.01)
    *H04N 21/44* (2011.01)
    *H04N 21/435* (2011.01)
    *H04N 21/439* (2011.01)

(52) U.S. Cl.
    CPC ... *H04N 21/4394* (2013.01); *H04N 21/44008* (2013.01); *H04N 21/4821* (2013.01)

(56) References Cited

U.S. PATENT DOCUMENTS

| | | |
|---|---|---|
| 5,799,133 A | 8/1998 | Hollier et al. |
| 7,185,355 B1 | 2/2007 | Ellis et al. |
| 9,372,933 B2 | 6/2016 | Keohane et al. |
| 9,774,911 B1 | 9/2017 | Thomas et al. |
| 10,141,006 B1 | 11/2018 | Burciu |
| 10,957,086 B1 | 3/2021 | Mathon et al. |
| 10,996,827 B2 | 5/2021 | Vaidyanath et al. |
| 2003/0194210 A1 | 10/2003 | Shiiyama |
| 2004/0093220 A1 | 5/2004 | Kirby et al. |
| 2006/0290712 A1 | 12/2006 | Hong et al. |
| 2012/0023251 A1 | 1/2012 | Pyle et al. |
| 2012/0131614 A1 | 5/2012 | Novi |
| 2012/0254405 A1 | 10/2012 | Ganesh et al. |
| 2014/0112506 A1 | 4/2014 | Hopkins |
| 2014/0334799 A1 | 11/2014 | Dhawan |
| 2015/0254404 A1 | 9/2015 | Ko et al. |
| 2018/0035163 A1 | 2/2018 | Thomas et al. |
| 2018/0095966 A1 | 4/2018 | Fourney et al. |
| 2019/0073365 A1 | 3/2019 | Jamshidi |
| 2019/0115009 A1 | 4/2019 | Misra et al. |
| 2021/0011593 A1 | 1/2021 | Vaidyanath et al. |
| 2021/0014547 A1 | 1/2021 | Vieron et al. |

OTHER PUBLICATIONS

Mucha, "Combination of automatic and manual testing for web accessibility," University of Agder (2018) (118 pages).

FIG. 2

| Category | Feature | Detection Channel |
|---|---|---|
| Metadata | Movie Genre/Theme/Tone | Metadata API |
| Metadata | Duration | Metadata API |
| Video | Distribution of [first/second/third] character show time | Facial recognition |
| Video | Number of scenes/locations | Video segmentation and clustering |
| Video | Number of character per scene | Facial detection |
| Video | Percentage of movie with visual effects | Visual effect detection |
| Video | Shot change rate | Shot detection |
| Video | strobe light frequency | Strobe light detector |
| Video | Pet/animal show time | Animal recognition |
| Audio | If there is a narrator throughout the movie | Voice recognition |
| Audio | Percentage of movie having music/singing | Music detection and recognition |
| Audio | Number of different audio events | Audio event detection |
| Audio | Percentage of non-English segments | Language detection |
| Text | Number of closed captions | CC analysis |
| Text | Rate of Closed Caption changing | CC analysis |
| Text | Number of non-verbal CC (e.g. soundbites, etc) | CC analysis |
| Text | Percentage of movie with no CC | CC analysis |
| Text | Number of unique words | CC analysis |

702 RECEIVE FIRST DATA

↓

704 DETERMINE A PLURALITY OF MULTIMODAL FEATURES FOR A PREDICTION MODEL

↓

706 TRAIN THE PREDICTION MODEL ACCORDING TO THE PLURALITY OF MULTIMODAL FEATURES

↓

708 OUTPUT THE TRAINED PREDICTION MODEL

↓

710 CAUSE A VIDEO CONTENT ITEM TO BE PROVIDED TO THE TRAINED PREDICTION MODEL

↓

712 DETERMINE A PREDICTED ACCESSIBILITY SCORE FOR THE VIDEO CONTENT ITEM

↓

714 SEND THE PREDICTED ACCESSIBILITY SCORE

↓

716 CAUSE THE PREDICTED ACCESSIBILITY SCORE TO BE DISPLAYED

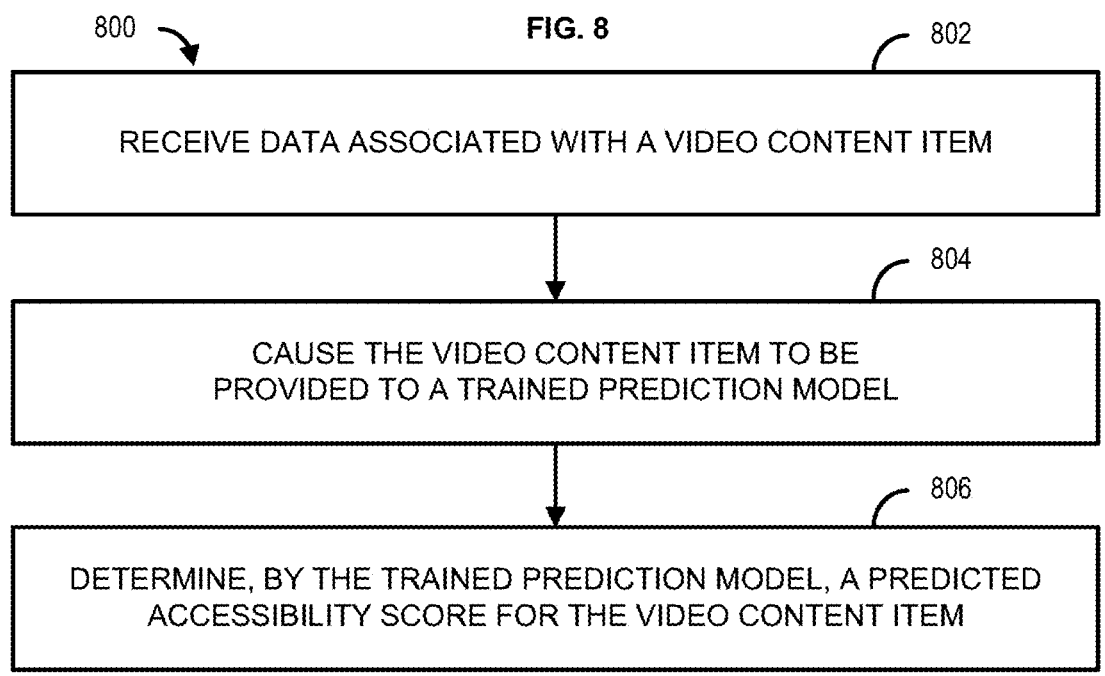

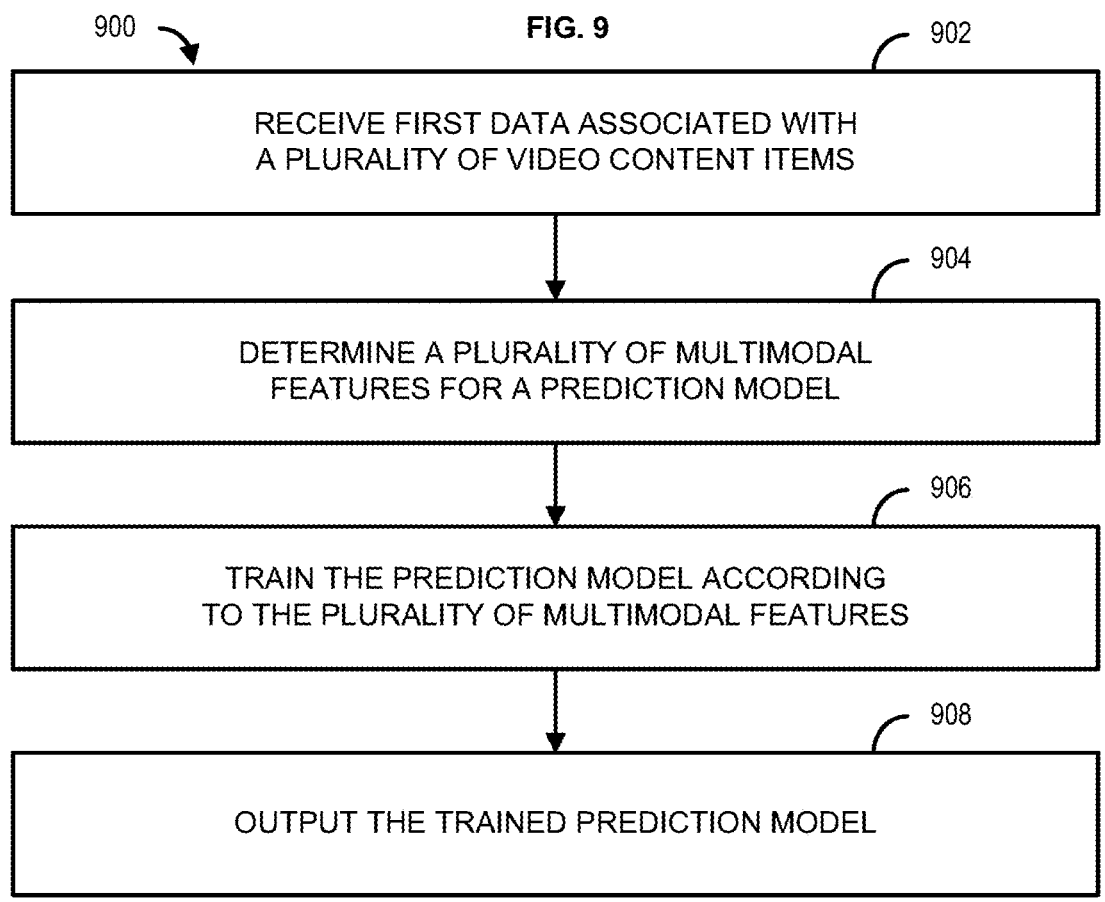

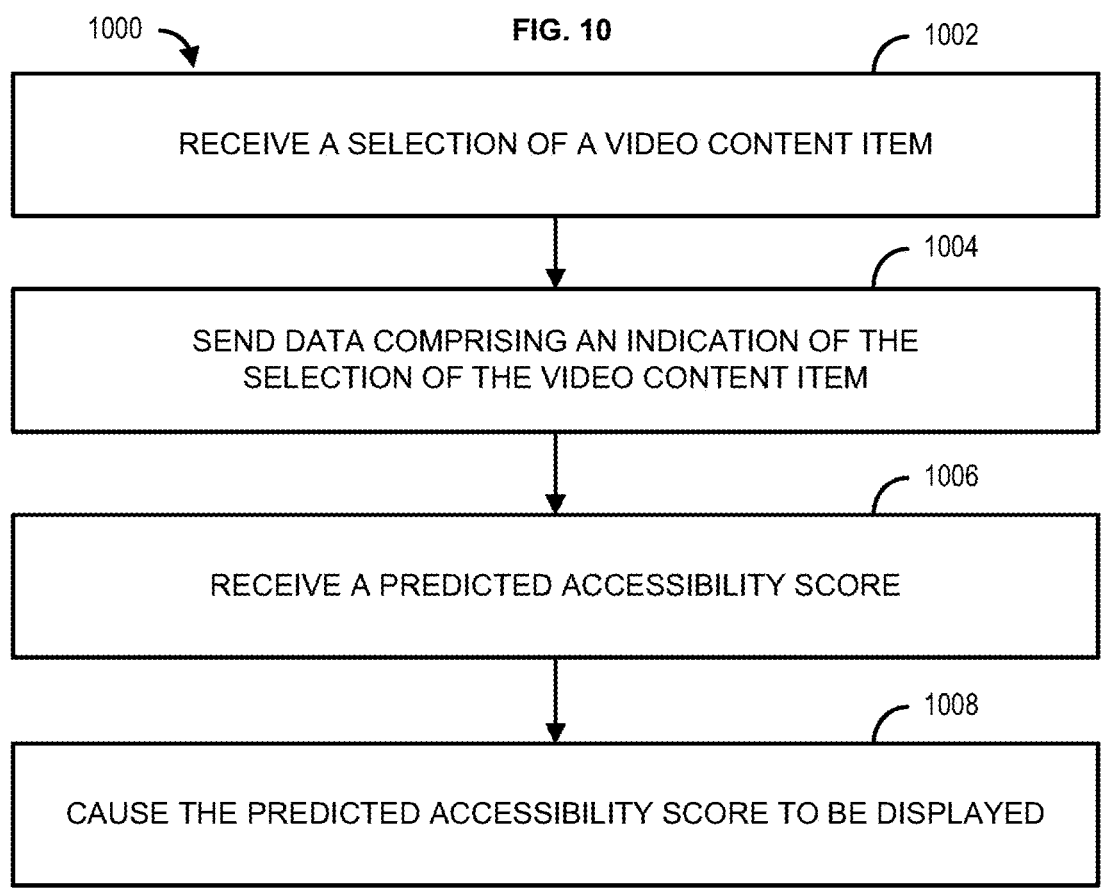

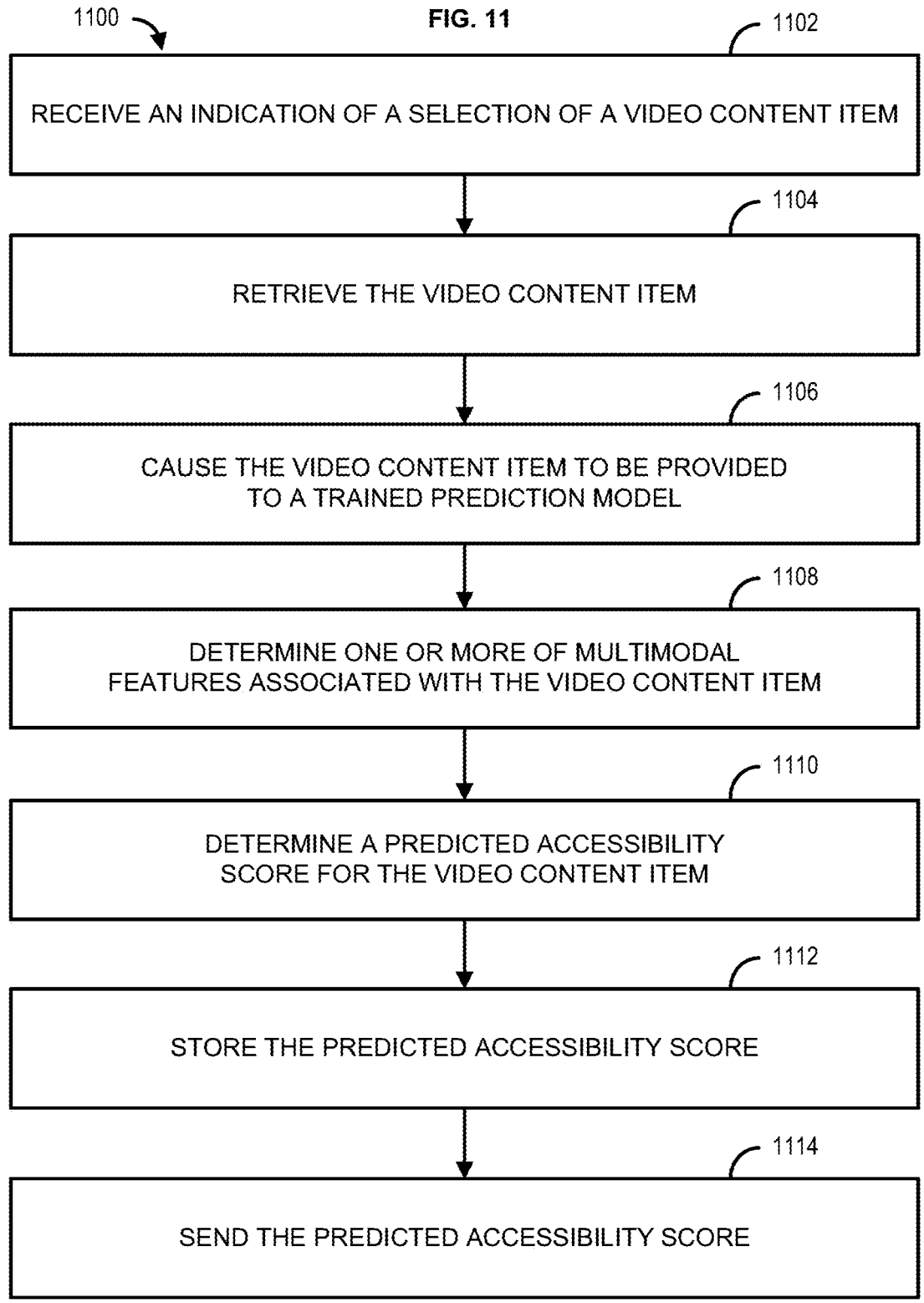

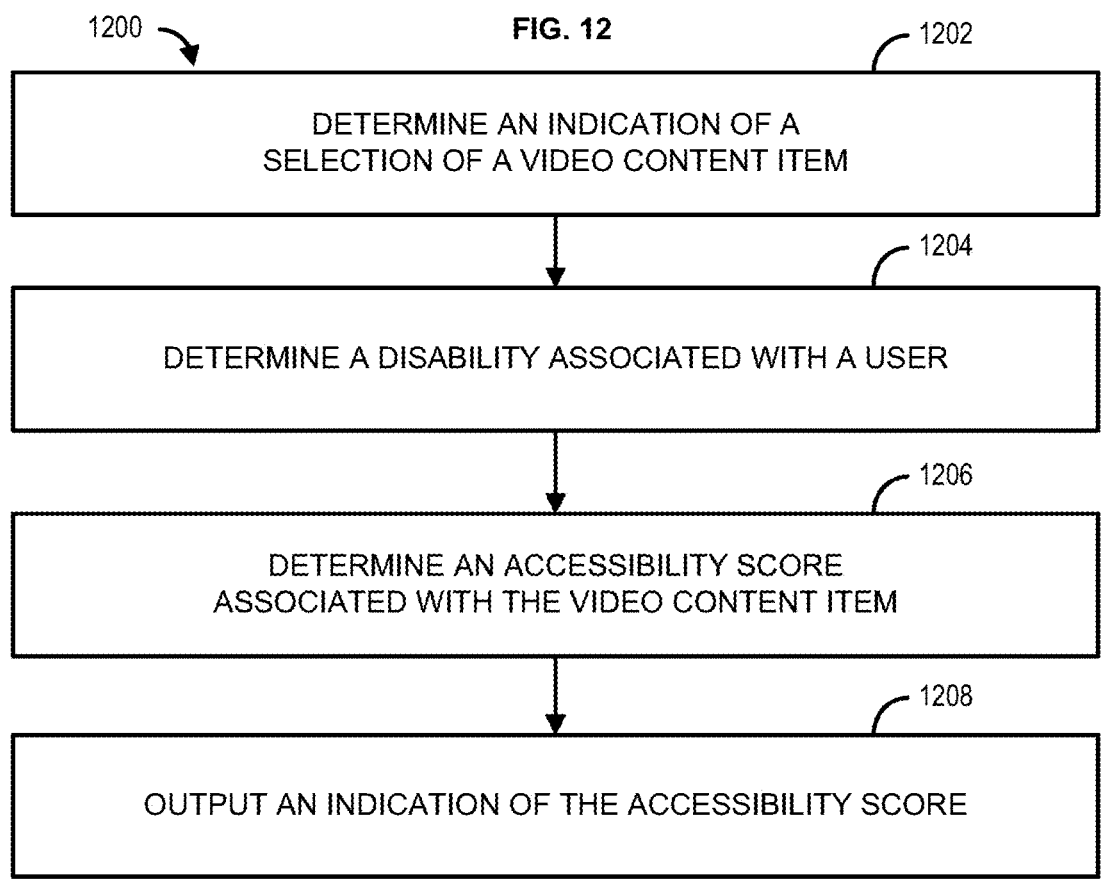

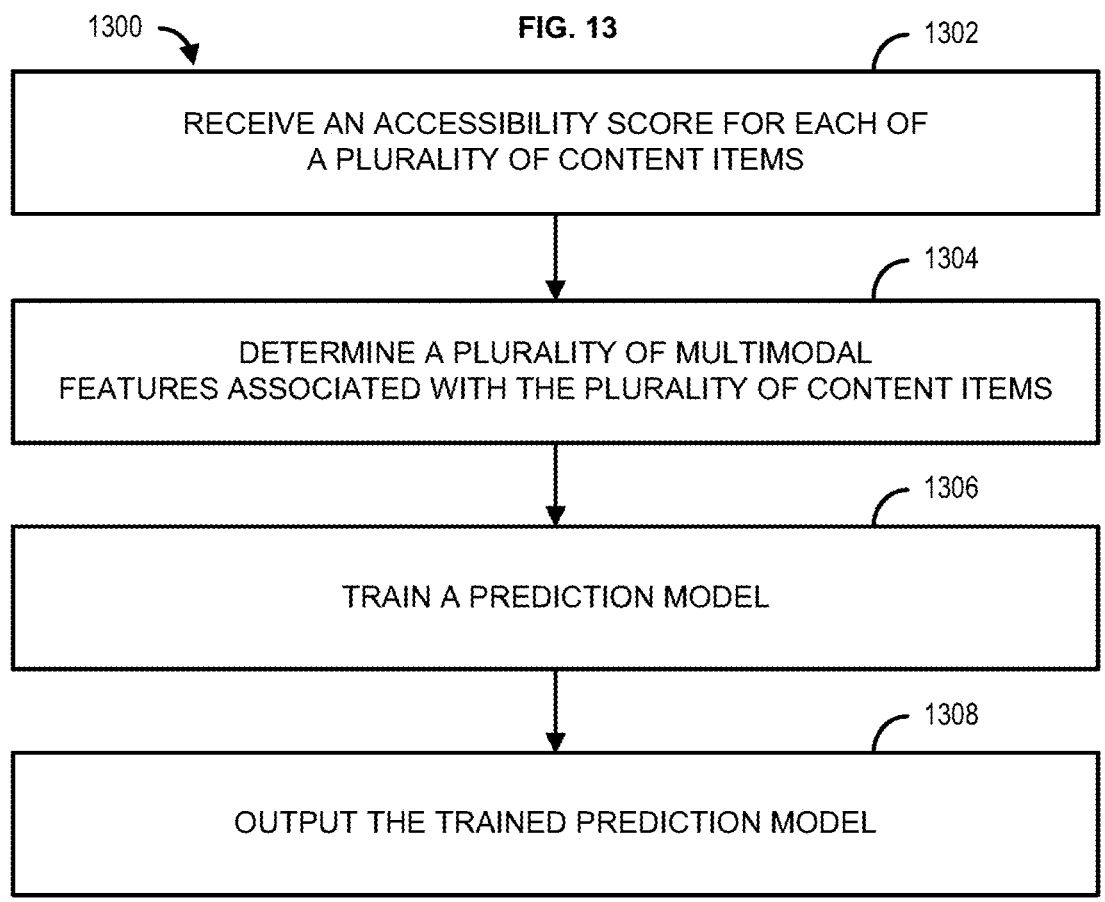

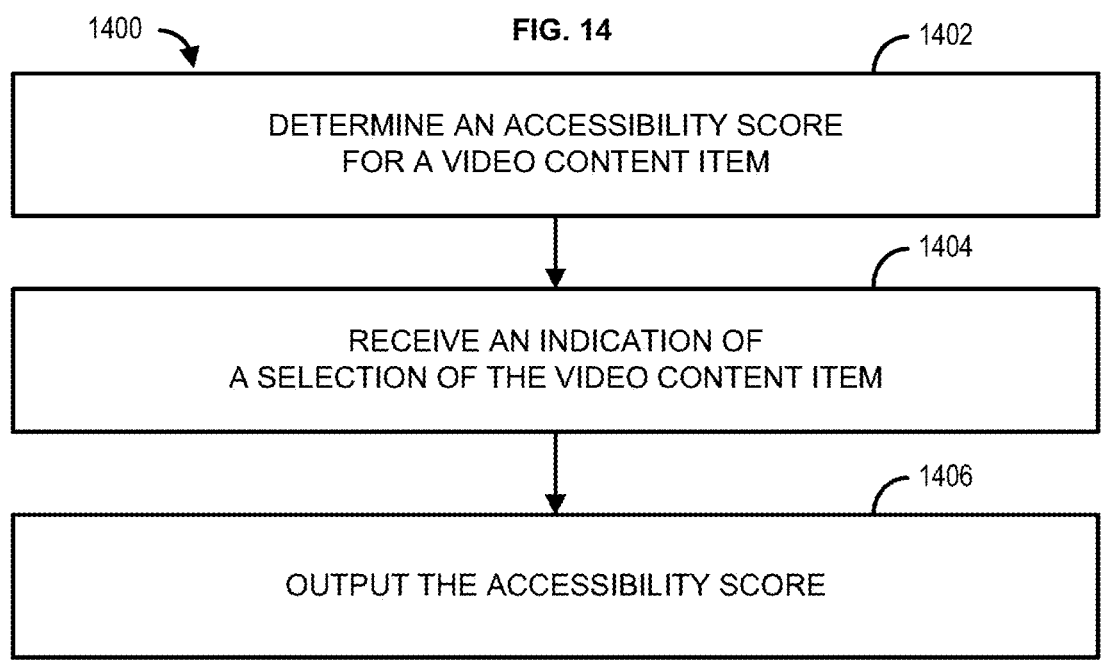

SYSTEMS AND METHODS FOR IMPROVED CONTENT ACCESSIBILITY SCORING

CROSS-REFERENCE TO RELATED PATENT APPLICATION

This application is a continuation of U.S. patent application Ser. No. 17/004,992, filed on Aug. 27, 2020, the entirety of which is incorporated by reference herein.

BACKGROUND

Content items are rated on a variety of metrics. For example, content items may be rated based on reception by audiences and/or critics' review scores. Such ratings schemes may indicate an average audience review score, an average critic score, a suggested viewer age, etc. These ratings schemes may be helpful when searching for a content item to view or purchase, such as when browsing a program guide or deciding on a movie to watch at a theater. However, such ratings schemes do not take into account metrics indicative of how accessible the content item may be to a person with impaired senses (e.g., hearing impaired, visually impaired, etc.) or for persons who desire to view content that requires less visual attention and/or audio attention. Though some program guides and theaters indicate whether content items may be presented with accessibility features (e.g., closed captioning), existing ratings schemes fail to account for a content item's relative level of accessibility based on the content item's features (e.g., imagery, dialogue, etc.). These and other considerations are described herein.

SUMMARY

It is to be understood that both the following general description and the following detailed description are exemplary and explanatory only and are not restrictive. Provided herein are methods and systems for improved accessibility scoring for content items. The present methods and systems may be used to determine predicted accessibility scores for content items, such as video content items. A predicted accessibility score may be based on a plurality of multimodal features present within a content item. A predicted accessibility score for a content item may indicate how accessible the content item may be for persons who are visually impaired, hearing impaired, cognitively impaired, etc., as well as for persons who desire to view content that requires less visual attention and/or audio attention as the case may be.

A prediction model may be trained based on a first dataset. The first dataset may indicate a plurality of video content items, a predetermined accessibility score for each of the plurality of video content items, and a plurality of multimodal features present within each of the plurality of video content items. The first dataset may be used to train the prediction model according to one or more machine learning and/or artificial intelligence techniques. The trained prediction model may be configured to provide predicted accessibility scores for other video content items. For example, a user of a user device may make a selection of a video content item. The user device may send second data to a computing device. The second data may include an indication of the selection of the video content item. The computing device may cause the second data to be provided to the trained prediction model. The trained prediction model may determine a predicted accessibility score for the video content item. The computing device may send the predicted accessibility score to the user device. The user device may cause the predicted accessibility score to be output. For example, the predicted accessibility score may be output (e.g., displayed) as part of a description of the video content item and/or provided as an audio message.

Other examples and configurations are possible. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 2 shows an example table;
FIG. 7 shows a flowchart for an example method;
FIG. 8 shows a flowchart for an example method;
FIG. 9 shows a flowchart for an example method;
FIG. 10 shows a flowchart for an example method;
FIG. 11 shows a flowchart for an example method;
FIG. 12 shows a flowchart for an example method;
FIG. 13 shows a flowchart for an example method;
and
FIG. 14 shows a flowchart for an example method.

DETAILED DESCRIPTION

Figure 1:
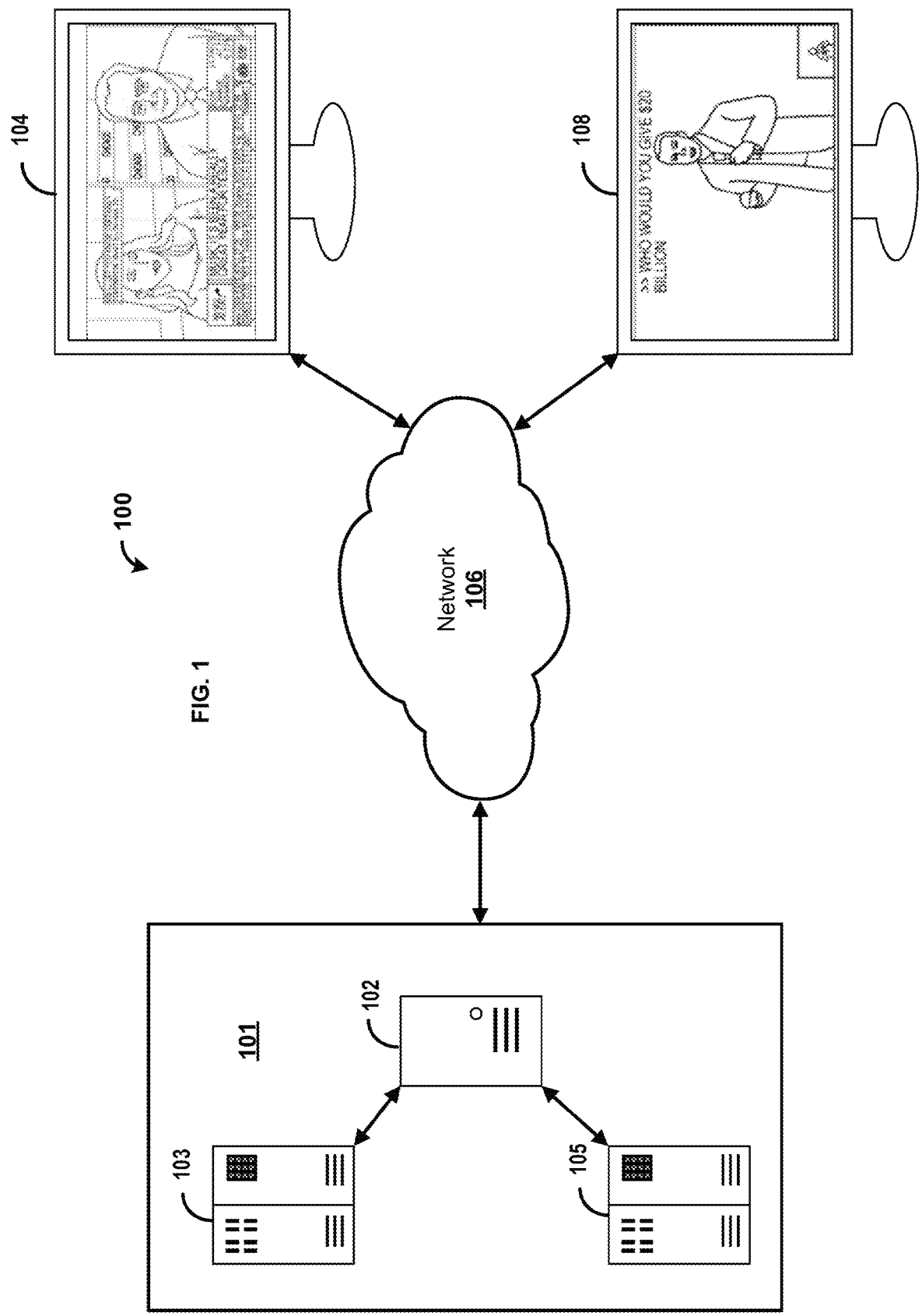
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods.

Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium may be implemented. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Provided herein are methods and systems for improved accessibility scoring for content items. The present methods and systems may be used to determine predicted accessibility scores for content items, such as video content items. A predicted accessibility score may be based on a plurality of multimodal features present within a content item. The plurality of multimodal features may include video features (e.g., based on video/image analysis), audio features (e.g., based on audio analysis), text-based features (e.g., based on closed-captioning analysis), features indicated by metadata (e.g., duration, genre, etc.), a combination thereof, and/or the like. A predicted accessibility score for a content item may indicate how accessible the content item may be for persons who are visually impaired, hearing impaired, cognitively impaired, etc., as well as for persons who desire to view content that requires less visual attention and/or audio attention as the case may be.

A predicted accessibility score may be based on methods that employ artificial intelligence, such as machine learning, as well as methods that do not rely on artificial intelligence. For example, a predicted accessibility score may be based on one or more multimodal features of the plurality of multimodal features present within a content item that meet or exceed a threshold(s). For example, it may be determined that the one or more multimodal features are present within the content item for a quantity or time and/or a percentage of a duration for the content item (e.g., scenes with dialog make up 70% of the content item). When the one or more multimodal features meet or exceed a first threshold, the predicted accessibility score may be considered "low." When the one or more multimodal features meet or exceed the first threshold as well as a second threshold, the predicted accessibility score may be considered "medium." When the one or more multimodal features meet or exceed the first threshold, the second threshold, well as a third threshold, the predicted accessibility score may be considered "high." The converse may be used as well for multimodal features where increased presence within the content item are associated with a lower level of accessibility. For example, when the one or more multimodal features meet or exceed the first threshold, the predicted accessibility score may be considered "high" rather than "low." Other examples and configurations are possible as well.

As discussed above, machine learning and other artificial intelligence techniques may be used when determining a predicted accessibility score. For example, a prediction model may be trained and configured to provide a predicted accessibly score for a content item. The training process may be based on a first dataset (e.g., a training dataset). The first dataset may indicate a plurality of video content items and a predetermined accessibility score for each of the plurality of video content items. The predetermined accessibility scores may be based on survey scores, review scores, etc., collected from multiple types of viewers of the plurality of video content items. The multiple types of viewers may be persons who are visually impaired, persons who are hearing impaired, persons who are cognitively impaired, etc., as well as persons who desire to view content that requires less visual attention and/or audio attention as the case may be.

Some, or all of the plurality of video content items may include an audio description track, such as audio related to secondary audio programming (SAP), the American Council of the Blind's Audio Description Project (ADP), and/or the like. The audio description track for a content item may provide narration regarding visual elements of the content item. The predetermined accessibility score for a content item having an audio description track may be based on a usage of the audio description track. For example, the predetermined accessibility score may be based on a ratio (e.g., a percentage, a fraction, etc.) of a quantity of viewers of the content item that enable the audio description track as compared to a quantity of total viewers of the content item. The predetermined accessibility score may be based on a quantity of viewers of the content item that enable the audio description track that meet or exceed a threshold.

The first dataset may indicate a plurality of multimodal features present within each of the plurality of video content items. Each of the plurality of multimodal features may differ within each of the plurality of video content items. For example, a first video content item may include one or more multimodal features that are not present at all—or are present to a lesser degree—within another video content item (e.g., a documentary film may have 40% more dialogue than a Sci-Fi film). The predetermined accessibility scores may be used as the "ground truth" regarding which of the plurality of multimodal features are most correlative with a high accessibility score or with a low accessibility score based on the type of viewer. The predetermined accessibility scores may also be based on one or more multimodal features of the plurality of multimodal features present within the first video content item that meet or exceed a threshold(s), as described above. Depending on which of the plurality of multimodal features are present within the first video content item, the predetermined accessibility score for the first video content item provided by a visually impaired person may differ greatly from the predetermined accessibility score for the first video content item provided by a hearing impaired person. For example, the first video content item may be a news program contain a large amount of on-screen textual features (e.g., graphics, charts, maps, etc.) that make the news program less accessible to a visually impaired person as compared to other a hearing impaired person who may be able to see the on-screen textual features.

The first dataset may be used to train the prediction model according to one or more machine learning and/or artificial intelligence techniques as further described herein. For example, the plurality of video content items may be analyzed to determine (e.g., extract) the plurality of multimodal features. The plurality of multimodal features and the predetermined accessibility score for each of the plurality of video content items may be used to train the prediction model. The trained prediction model may be configured to provide predicted accessibility scores for other video content items. For example, the trained prediction model may be configured to provide predicted accessibility scores for video content items that are not within the plurality of video content items used to train the prediction model. The prediction model may be trained by a computing device(s), such as a server(s) of a content distribution network (CDN). The trained prediction model may be output by the computing device(s) and provided to another computing device(s), such as another server(s) of the CDN and/or to a user device(s) associated with the CDN.

As described herein, the trained prediction model may be configured to provide a predicted accessibility score for video content items. For example, a user of a user device may make a selection of a video content item, such as when browsing content items in a program guide. The user device may send second data to a computing device, such as a server. The second data may include an indication of the selection of the video content item. The computing device may cause the second data to be provided to the trained prediction model. The trained prediction model may retrieve the video content item for analysis (e.g., from a video cache) based on the second data. The trained prediction model may analyze the video content item and determine (e.g., extract) one or more multimodal features of the plurality of multimodal features that are present within the video content item. The trained prediction model may determine a predicted accessibility score for the video content item. For example, the trained prediction model may determine the predicted accessibility score for the video content item based on the one or more multimodal features. The computing device may send the predicted accessibility score to the user device. The user device may cause the predicted accessibility score to be output. For example, the predicted accessibility score may be displayed as part of a description of the video content item and/or provided as an audio message. For example, the predicted accessibility score may be output (e.g., displayed) within the program guide. The predicted accessibility score may be output (e.g., displayed) as a percentage (e.g., 85%), a letter rating (e.g., B+), a graphical representation (e.g., 3.5 stars/icons out of 4), an indication of a comparison of the predicted accessibility score against a known, or predicted, accessibility score for another content item (e.g., a comparison of the predicted accessibility score to an accessibility score for a previously viewed content item), a combination thereof, and/or the like. The predicted accessibility score may be provided as an audio message. The audio message may be emitted by the user device. The audio message may provide the predicted accessibility score as a percentage (e.g., "The accessibility score for this movie is 85%"), a letter rating (e.g., "This movie is rated 'B+' for accessibility"), a numerical rating (e.g., "This movie is rated '3.5 stars out of 4' for accessibility"), an indication of a comparison of the predicted accessibility score against a known, or predicted, accessibility score for another content item (e.g., "This movie is rated higher for accessibility than the movie you watched last night"), a combination thereof, and/or the like Turning now to FIG. 1, an example system 100 is shown. The system 100 may comprise a content distribution network (CDN) 101 for content delivery, a first user device 104, and a second user device 106. The CDN 101 may include a server 102. The server 102 may be an edge server, a central office server, a headend, a node server, a combination thereof, and/or the like. The CDN 101 may receive content (e.g., data, input programming, and/or the like) from multiple sources. The CDN 101 may combine the content from the various sources and may distribute the content to user devices (e.g., the first user device 104 and/or the second user device 108) via a network 106.

The CDN 101 may receive content from a variety of sources. The network 106 may be configured to send content from a variety of sources using a variety of network paths, protocols, devices, and/or the like. The network 106 may be managed (e.g., deployed, serviced) by a content provider, a service provider, and/or the like. The network 106 may have a plurality of communication links connecting a plurality of devices. The network 106 may distribute signals from the CDN 101 to user devices, such as the first user device 104 or the second user device 108. The network 106 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

The first user device 104 and/or the second user device 108 may be a set-top box, a digital streaming device, a gaming device, a media storage device, a digital recording device, a computing device, a mobile computing device (e.g., a laptop, a smartphone, a tablet, etc.), a combination thereof, and/or the like. The first user device 104 and/or the second user device 108 may implement one or more applications, such as content viewers, social media applications, news applications, gaming applications, content stores, electronic program guides, and/or the like. The server 102 may provide services related to content and/or applications. The server 102 may have an application store. The application store may be configured to allow users to purchase, download, install, upgrade, and/or otherwise manage applications. The server 102 may be configured to allow users to download applications to a device, such as the first user device 104 and/or the second user device 108. The applications may enable a user of the first user device 104 and/or the second user device 108 to browse and select content items from a program guide. The server 102 may run one or more application services to send data, handle requests, and/or otherwise facilitate operation of applications for a user of the first user device 104 and/or the second user device 108.

The server 102 may be in communication with one or more content sources 103,105 of the CDN 101. The one or more content sources 103,105 may be managed by third party content providers, service providers, online content providers, over-the-top content providers, and/or the like. Content may be provided by the one or more content sources 103,105 via a subscription, by individual item purchase or rental, and/or the like. The one or more content sources 103,105 may be configured to send content (e.g., video, audio, games, applications, data) to the first user device 104 and/or the second user device 108 via the server 102 and the network 106.

Each content item provided by the one or more content sources 103,105 may be associated with a plurality of multimodal features present within the content item. For example, FIG. 2 shows a table 200 of example multimodal features for a content item. Each multimodal feature may be associated with a modality, as shown in the first column 202 of the table 200; a feature name, as shown in the second column 204 of the table 200; and a modality detector, as shown in the third column 206 of the table 200. The modality for a multimodal feature may indicate whether the multimodal feature is a video feature (e.g., based on video/image analysis), an audio feature (e.g., based on audio analysis), a text-based feature (e.g., based on closed-captioning analysis), or a feature indicated by metadata (e.g., duration, genre, etc.). The modality detector associated with a multimodal feature may correspond to an application programming interface (API), a video analysis method, an audio analysis method, and/or a text analysis method that may be used when analyzing a content item to determine (e.g., extract) the particular multimodal feature.

For example, as shown in the second row of the table 200, the multimodal feature of "Duration" may be associated with a "Metadata" modality and a "Metadata API" multimodal detector. The Metadata API may be used to analyze metadata of a content item to determine the content item's duration. As another example, as shown in the fifth row of the table 200, the multimodal feature of "Number of characters per scene" may be associated with a "Video" modality and a "Facial recognition" multimodal detector. One or more facial recognition techniques may be used to analyze video fragments and/or frames of a content item to determine how many characters are present in each scene of the content item. As another example, as shown in the tenth row of the table 200, the multimodal feature may be related to whether narration is used in a content item based on an "Audio" modality and a "Voice recognition" multimodal detector. One or more voice recognition techniques may be used to analyze an audio stream(s) of a content item to determine whether a narrator is used throughout the content item.

It is to be understood that the example multimodal features and multimodal detectors shown in the table 200 are not intended to be an exhaustive list of all possible multimodal features or multimodal detectors. Other multimodal features and multimodal detectors are contemplated. For example, a multimodal detector may relate to on-screen text analysis (e.g., text overlays, chyrons, etc.). As another example, a multimodal detector may relate to augmented reality features, virtual reality features, a combination thereof, and/or the like.

The multimodal detectors may be resident on, or other otherwise controlled by, the first user device 104, the second user device 108, the server 102, and/or the one or more content sources 103,105. For example, the multimodal detectors may be resident on, or other otherwise controlled by, the server 102. The server 102 may receive a content item (or a portion(s) thereof) from storage (e.g., a cache) or from another computing device (e.g., the one or more content sources 103,105). The server 102 may use one or more of the multimodal detectors to determine (e.g., extract) one or more multimodal features present within the content item. The server 102 may determine (e.g., extract) the one or more multimodal features present within the content item based on a request received from the first user device 104 and/or the second user device 108. The server 102 may store an indication of the one or more multimodal features present within the content item. Other examples are possible as well (e.g., the one or more content sources 103,105 may determine/extract one or more multimodal features present within a content item).

The multimodal features present within a content item may influence a relative level of accessible of the content item as compared to other content items. For example, as shown in FIG. 1, the first user device 104 may output a news program, which may contain a multimodal feature relating to on-screen text (e.g., text overlays, chyrons, etc.). The news program may contain a large amount of on-screen text (e.g., as indicated by a corresponding multimodal detector for on-screen text analysis) that makes the news program less accessible to a visually impaired person as compared to other content items. As another example, the second user device 108 may output a stand-up comedy special, which may contain a multimodal feature relating to number of characters per scene. The stand-up comedy special may only have one character (e.g., the comedian) in each scene (e.g., as indicated by a multimodal detector for facial recognition) such that the stand-up comedy special may be more accessible to a visually impaired person as compared to the news program.

The relative level of accessibility for a content item may be indicated by an accessibility score. An accessibility score may be output at a user device. For example, the accessibility score may be output (e.g., displayed) within a program guide as a percentage (e.g., 85%), a letter rating (e.g., B+), a graphical representation (e.g., 3.5 stars/icons out of 4), an indication of a comparison of the predicted accessibility score against a known, or predicted, accessibility score for another content item (e.g., a comparison of the predicted accessibility score to an accessibility score for a previously viewed content item), a combination thereof, and/or the like. The predicted accessibility score may be provided as an audio message. The audio message may be emitted by the user device. The audio message may provide the predicted accessibility score as a percentage (e.g., "The accessibility score for this movie is 85%"), a letter rating (e.g., "This movie is rated 'B+' for accessibility"), a numerical rating (e.g., "This movie is rated '3.5 stars out of 4' for accessibility"), an indication of a comparison of the predicted accessibility score against a known, or predicted, accessibility score for another content item (e.g., "This movie is rated higher for accessibility than the movie you watched last night"), a combination thereof, and/or the like. An accessibility score for a content item may indicate how accessible the content item may be for persons who are visually impaired, hearing impaired, cognitively impaired, etc., as well as for persons who desire to view content that requires less visual attention and/or audio attention as the case may be. Accessibility scores may be predetermined based on survey scores, review scores, etc., collected from multiple types of viewers of a content item. The multiple types of viewers may be persons who are visually impaired, persons who are hearing impaired, persons who are cognitively impaired, etc., as well as persons who desire to view content that requires less visual attention and/or audio attention as the case may be.

Some, or all of the plurality of video content items may include an audio description track, such as audio related to secondary audio programming (SAP), the American Council of the Blind's Audio Description Project (ADP), and/or the like. The audio description track for a content item may provide narration regarding visual elements of the content item. The predetermined accessibility score for a content item having an audio description track may be based on a usage of the audio description track. For example, the predetermined accessibility score may be based on a ratio (e.g., a percentage, a fraction, etc.) of a quantity of viewers of the content item that enable the audio description track as compared to a quantity of total viewers of the content item. The predetermined accessibility score may be based on a quantity of viewers of the content item that enable the audio description track that meet or exceed a threshold.

The system 100 may be configured to determine predicted accessibility scores for content items that do not have a predetermined accessibility score. For example, a predicted accessibly score may be determined for a new content item and/or a content item for which no survey score, review score, etc., has been collected from previous viewers of the content item. The system 100 may provide predicted accessibility scores via program guides output via the first user device 104 and/or the second user device 108.

Figure 3:
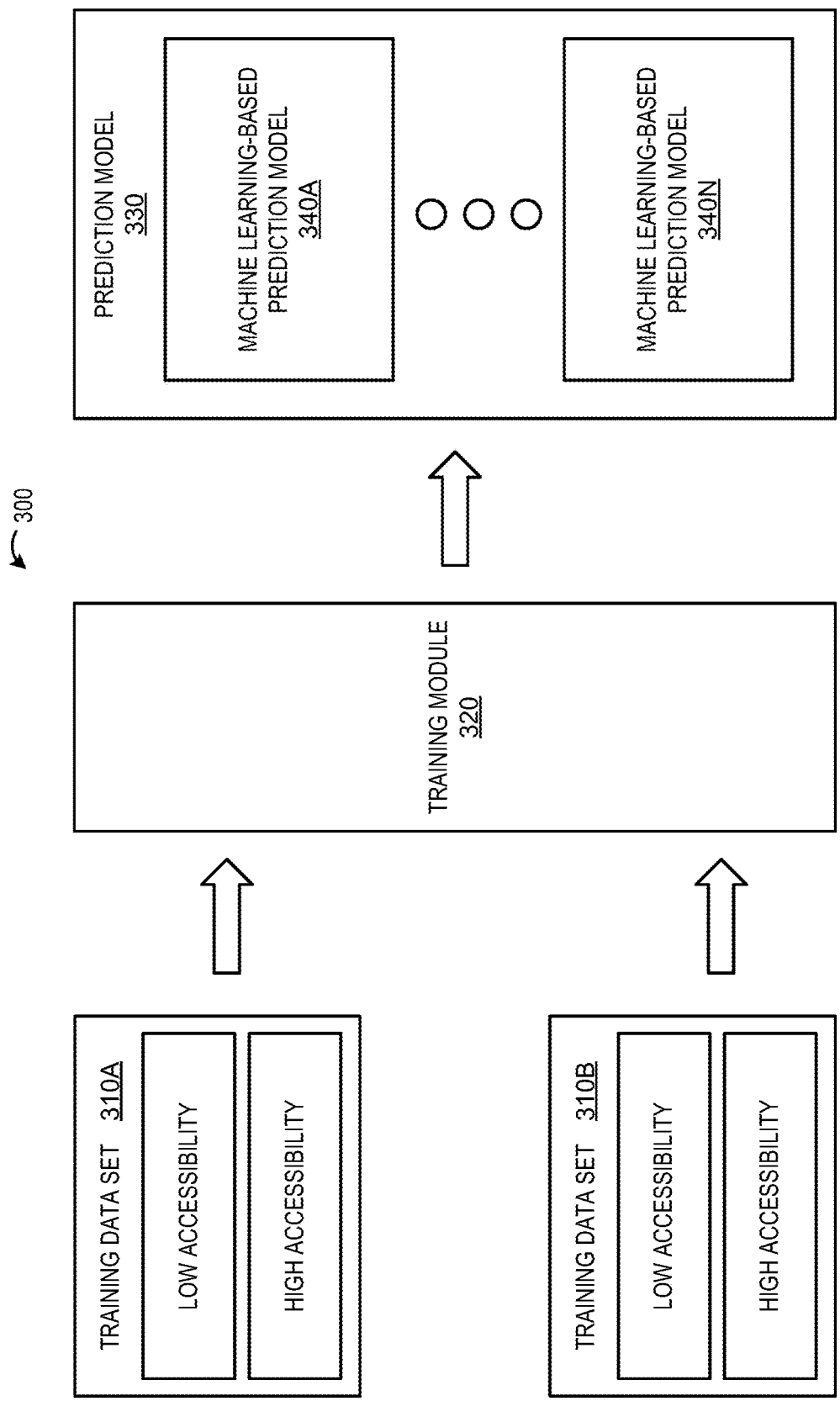
FIG. 3 shows an example system.

Machine learning and other artificial intelligence techniques may be used to train a prediction model. The prediction model, once trained, may be configured to determine a predicted accessibility score. For example, the first user device 104, the second user device 108, the server 102, and/or the one or more content sources 103,105 of the system 100 may use the trained prediction model to determine a predicted accessibility score for a content item. The prediction model (referred to herein as the at least one prediction model 330, or simply the prediction model 330) may be trained by a system 300 as shown in FIG. 3.

The system 300 may be configured to use machine learning techniques to train, based on an analysis of one or more training datasets 310A-310B by a training module 320, the at least one prediction model 330. The at least one prediction model 330, once trained, may be configured to provide a predicted accessibility score for a content item. A dataset indicative of a plurality of content items and a predetermined accessibility score for each of the plurality of content items may be used by the training module 320 to train the at least one prediction model 330. Each of the plurality of content items in the dataset may be associated with one or more multimodal features of a plurality of multimodal features that are present within the content item. The plurality of multimodal features and the predetermined accessibility score for each of the plurality of content items may be used to train the at least one prediction model 330.

The training dataset 310A may comprise a first portion of the plurality of content items in the dataset. Each content item in the first portion may have a labeled (e.g., predetermined) accessibility score (e.g., percentage, rating, etc.) and one or more labeled multimodal features present within the content item. The training dataset 310B may comprise a second portion of the plurality of content items in the dataset. Each content item in the second portion may have a labeled (e.g., predetermined) accessibility score (e.g., percentage, rating, etc.) and one or more labeled multimodal features present within the content item. The plurality of content items may be randomly assigned to the training dataset 310A, the training dataset 310B, and/or to a testing dataset. In some implementations, the assignment of content items to a training dataset or a testing dataset may not be completely random. In this case, one or more criteria may be used during the assignment, such as ensuring that similar numbers of content items with different accessibility scores and/or multimodal features are in each of the training and testing datasets. In general, any suitable method may be used to assign the content items to the training or testing datasets, while ensuring that the distributions of accessibility scores and/or multimodal features are somewhat similar in the training dataset and the testing dataset.

The training module 320 may use the first portion and the second portion of the plurality of content items to determine one or more multimodal features that are indicative of a high accessibility score. That is, the training module 320 may determine which multimodal features present within the plurality of content items are correlative with a high accessibility score. The one or more multimodal features indicative of a high accessibility score may be used by the training module 320 to train the prediction model 330. For example, the training module 320 may train the prediction model 330 by extracting a feature set (e.g., one or more multimodal features) from the first portion in the training dataset 310A according to one or more feature selection techniques. The training module 320 may further define the feature set obtained from the training dataset 310A by applying one or more feature selection techniques to the second portion in the training dataset 310B that includes statistically significant features of positive examples (e.g., high accessibility scores) and statistically significant features of negative examples (e.g., low accessibility scores). The training module 320 may train the prediction model 330 by extracting a feature set from the training dataset 310B that includes statistically significant features of positive examples (e.g., high accessibility scores) and statistically significant features of negative examples (e.g., low accessibility scores).

The training module 320 may extract a feature set from the training dataset 310A and/or the training dataset 310B in a variety of ways. For example, the training module 320 may extract a feature set from the training dataset 310A and/or the training dataset 310B using a multimodal detector (e.g., as shown in FIG. 2). The training module 320 may perform feature extraction multiple times, each time using a different feature-extraction technique. In one example, the feature sets generated using the different techniques may each be used to generate different machine learning-based prediction models 340. For example, the feature set with the highest quality metrics may be selected for use in training. The training module 320 may use the feature set(s) to build one or more machine learning-based prediction models 340A-340N that are configured to provide a predicted accessibility score for a content item.

The training dataset 310A and/or the training dataset 310B may be analyzed to determine any dependencies, associations, and/or correlations between multimodal features and the predetermined accessibility scores in the training dataset 310A and/or the training dataset 310B. The identified correlations may have the form of a list of multimodal features that are associated with different predetermined accessibility scores. The multimodal features may be considered as features (or variables) in the machine learning context. The term "feature," as used herein, may refer to any characteristic of an item of data that may be used to determine whether the item of data falls within one or more specific categories or within a range. By way of example, the features described herein may comprise one or more multimodal features, such as those discussed herein with respect to FIG. 2.

A feature selection technique may comprise one or more feature selection rules. The one or more feature selection rules may comprise a multimodal feature occurrence rule. The multimodal feature occurrence rule may comprise determining which multimodal features in the training dataset 310A occur over a threshold number of times and identifying those multimodal features that satisfy the threshold as candidate features. For example, any multimodal features that appear greater than or equal to 5 times in the training dataset 310A may be considered as candidate features. Any multimodal features appearing less than 5 times may be excluded from consideration as a feature. Other threshold numbers may be used as well.

A single feature selection rule may be applied to select features or multiple feature selection rules may be applied to select features. The feature selection rules may be applied in a cascading fashion, with the feature selection rules being applied in a specific order and applied to the results of the previous rule. For example, the multimodal feature occurrence rule may be applied to the training dataset 310A to generate a first list of multimodal features. A final list of candidate multimodal features may be analyzed according to additional feature selection techniques to determine one or more candidate multimodal feature groups (e.g., groups of multimodal features that may be used to predict an accessibility score). Any suitable computational technique may be used to identify the candidate multimodal feature groups using any feature selection technique such as filter, wrapper, and/or embedded methods. One or more candidate multimodal feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms used by the system 300. Instead, features may be selected on the basis of scores in various statistical tests for their correlation with the outcome variable (e.g., an accessibility score).

As another example, one or more candidate multimodal feature groups may be selected according to a wrapper method. A wrapper method may be configured to use a subset of features and train the prediction model 330 using the subset of features. Based on the inferences that drawn from a previous model, features may be added and/or deleted from the subset. Wrapper methods include, for example, forward feature selection, backward feature elimination, recursive feature elimination, combinations thereof, and the like. For example, forward feature selection may be used to identify one or more candidate multimodal feature groups. Forward feature selection is an iterative method that begins with no features. In each iteration, the feature which best improves the model is added until an addition of a new variable does not improve the performance of the model. As another example, backward elimination may be used to identify one or more candidate multimodal feature groups. Backward elimination is an iterative method that begins with all features in the model. In each iteration, the least significant feature is removed until no improvement is observed on removal of features. Recursive feature elimination may be used to identify one or more candidate multimodal feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate multimodal feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 320 has generated a feature set(s), the training module 320 may generate the one or more machine learning-based prediction models 340A-340N based on the feature set(s). A machine learning-based prediction model (e.g., any of the one or more machine learning-based prediction models 340A-340N) may refer to a complex mathematical model for data classification that is generated using machine-learning techniques as described herein. In one example, a machine learning-based prediction model may include a map of support vectors that represent boundary features. By way of example, boundary features may be selected from, and/or represent the highest-ranked features in, a feature set.

The training module 320 may use the feature sets extracted from the training dataset 310A and/or the training dataset 310B to build the one or more machine learning-based prediction models 340A-340N for each classification category (e.g., accessibility score ranges, such as 1/5 (20%) through 5/5 (100%)). In some examples, the one or more machine learning-based prediction models 340A-340N may be combined into a single machine learning-based prediction model 340 (e.g., an ensemble model). Similarly, the prediction model 330 may represent a single classifier containing a single or a plurality of machine learning-based prediction models 340 and/or multiple classifiers containing a single or a plurality of machine learning-based prediction models 340 (e.g., an ensemble classifier).

The extracted features (e.g., one or more candidate multimodal features) may be combined in the one or more machine learning-based prediction models 340A-340N that are trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting prediction model 330 may comprise a decision rule or a mapping for each candidate multimodal feature in order to assign an accessibility score to a class (e.g., accessibility score ranges, such as ⅕ (20%) through 5/5 (100%)). As described further herein, the resulting prediction model 330 may be used to provide predicted accessibility scores for content items. The candidate multimodal features and the prediction model 330 may be used to predict accessibility scores for content items in the testing dataset (e.g., a third portion of the plurality of content items).

Figure 4:
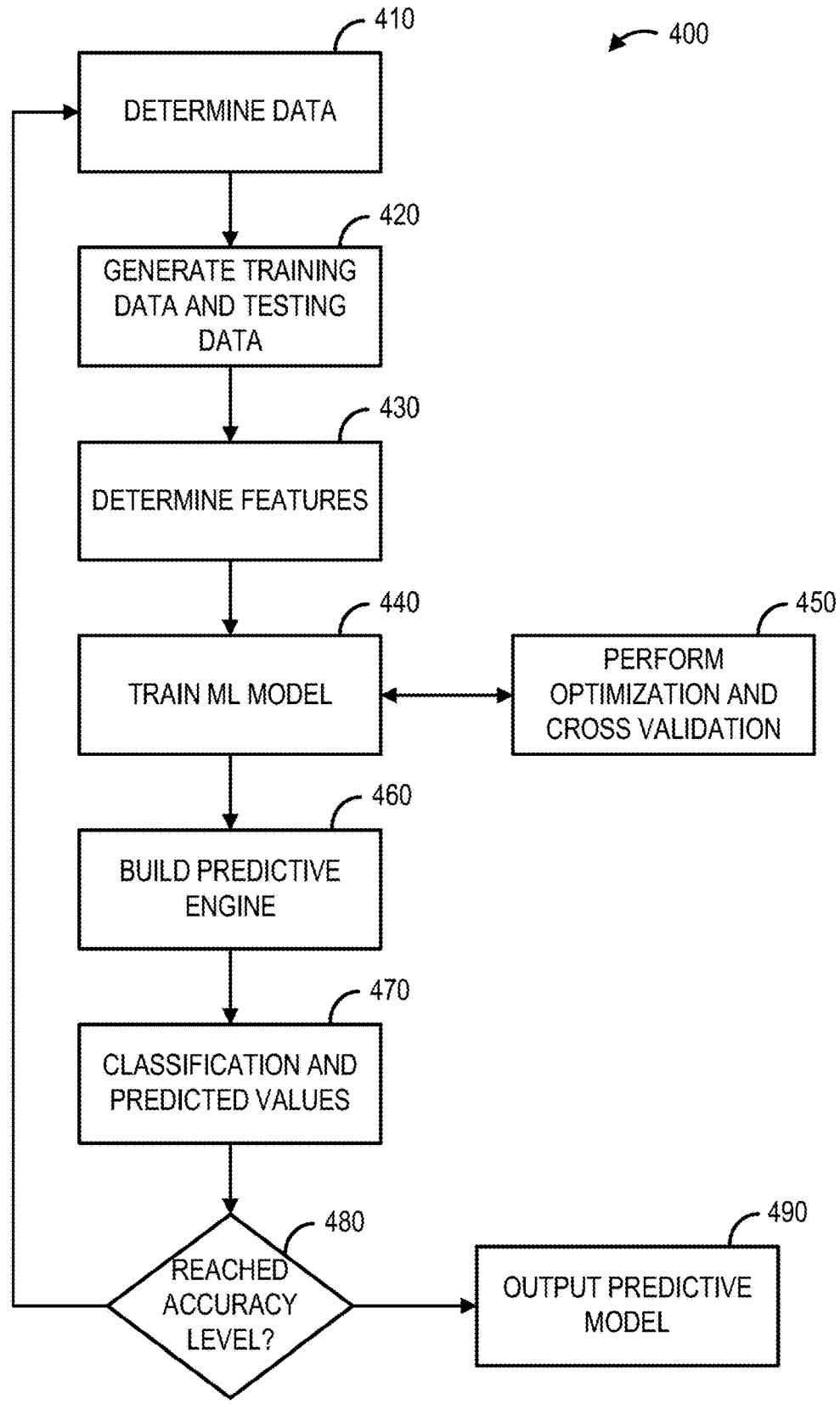
FIG. 4 shows a flowchart for an example method.

FIG. 4 is a flowchart illustrating an example training method 400 for generating the prediction model 330 using the training module 320. The training module 320 can implement supervised, unsupervised, and/or semi-supervised (e.g., reinforcement based) machine learning-based prediction models 340A-340N. The method 400 illustrated in FIG. 4 is an example of a supervised learning method; variations of this example of training method are discussed below, however, other training methods can be analogously implemented to train unsupervised and/or semi-supervised machine learning models. The method 400 may be implemented by the first user device 104, the second user device 108, the server 102, and/or the one or more content sources 103,105.

At step 410, the training method 400 may determine (e.g., access, receive, retrieve, etc.) first content items (e.g., the first portion of the plurality of content items described above) and second content items (e.g., the second portion of the plurality of content items described above). The first content items and the second content items may each comprise one or more multimodal features and a predetermined accessibility score. The training method 400 may generate, at step 420, a training dataset and a testing dataset. The training dataset and the testing dataset may be generated by randomly assigning content items from the first content items and/or the second content items to either the training dataset or the testing dataset. In some implementations, the assignment of content items as training or test samples may not be completely random. As an example, only the content items for a specific multimodal feature(s) and/or range(s) of predetermined accessibility scores may be used to generate the training dataset and the testing dataset. As another example, a majority of the content items for the specific multimodal feature(s) and/or range(s) of predetermined accessibility scores may be used to generate the training dataset. For example, 75% of the content items for the specific multimodal feature(s) and/or range(s) of predetermined accessibility scores may be used to generate the training dataset and 25% may be used to generate the testing dataset.

The training method 400 may determine (e.g., extract, select, etc.), at step 430, one or more features that can be used by, for example, a classifier to differentiate among different classifications (e.g., accessibility scores). The one or more features may comprise a set of multimodal features. As an example, the training method 400 may determine a set features from the first content items. As another example, the training method 400 may determine a set of features from the second content items. In a further example, a set of features may be determined from other content items of the plurality of content items (e.g., a third portion) associated with a specific multimodal feature(s) and/or range(s) of predetermined accessibility scores that may be different than the specific multimodal feature(s) and/or range(s) of predetermined accessibility scores associated with the content items of the training dataset and the testing dataset. In other words, the other content items (e.g., the third portion) may be used for feature determination/selection, rather than for training. The training dataset may be used in conjunction with the other content items to determine the one or more features. The other content items may be used to determine an initial set of features, which may be further reduced using the training dataset.

The training method 400 may train one or more machine learning models (e.g., one or more prediction models) using the one or more features at step 440. In one example, the machine learning models may be trained using supervised learning. In another example, other machine learning techniques may be employed, including unsupervised learning and semi-supervised. The machine learning models trained at step 440 may be selected based on different criteria depending on the problem to be solved and/or data available in the training dataset. For example, machine learning models can suffer from different degrees of bias. Accordingly, more than one machine learning model can be trained at 440, and then optimized, improved, and cross-validated at step 450.

The training method 400 may select one or more machine learning models to build the prediction model 330 at step 460. The prediction model 330 may be evaluated using the testing dataset. The prediction model 330 may analyze the testing dataset and generate classification values and/or predicted values (e.g., accessibility scores) at step 470. Classification and/or prediction values may be evaluated at step 480 to determine whether such values have achieved a desired accuracy level. Performance of the prediction model 330 may be evaluated in a number of ways based on a number of true positives, false positives, true negatives, and/or false negatives classifications of the plurality of data points indicated by the prediction model 330.

For example, the false positives of the prediction model 330 may refer to a number of times the prediction model 330 incorrectly assigned a high accessibility score to a content item associated with a low predetermined accessibility score. Conversely, the false negatives of the prediction model 330 may refer to a number of times the machine learning model assigned a low accessibility score to a content item associated with a high predetermined accessibility score. True negatives and true positives may refer to a number of times the prediction model 330 correctly assigned accessibility scores to content items based on the known, predetermined accessibility score for each content item. Related to these measurements are the concepts of recall and precision. Generally, recall refers to a ratio of true positives to a sum of true positives and false negatives, which quantifies a sensitivity of the prediction model 330. Similarly, precision refers to a ratio of true positives a sum of true and false positives. When such a desired accuracy level is reached, the training phase ends and the prediction model 330 may be output at step 490; when the desired accuracy level is not reached, however, then a subsequent iteration of the training method 400 may be performed starting at step 310 with variations such as, for example, considering a larger collection of content items.

The prediction model 330 may be output at step 490. The prediction model 330 may be configured to provide predicted accessibility scores for content items that are not within the plurality of content items used to train the prediction model. For example, the prediction model 330 may be trained and output by a first computing device. The first computing device may provide the prediction model 330 to a second computing device. As described herein, the method 400 may be implemented by the first user device 104, the second user device 108, the server 102, and/or the one or more content sources 103,105. The first computing device may be any one of the first user device 104, the second user device 108, the server 102, and/or the one or more content sources 103,105. The second computing device may be any one of the first user device 104, the second user device 108, the server 102, and/or the one or more content sources 103,105.

Figure 5A:
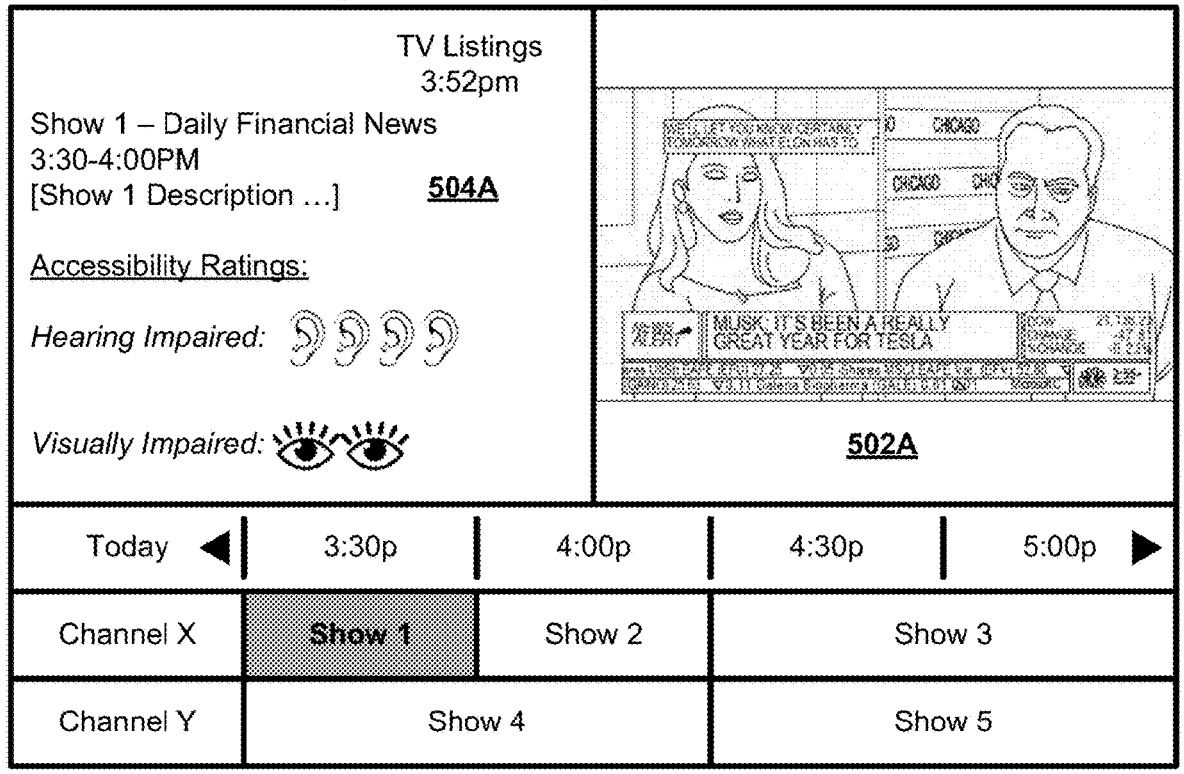
FIGS. 5A and 5B show example user interfaces.

Turning now to FIG. 5A, an example first view 500 of a program guide is shown. A user of a user device, such as the first user device 104 and/or the second user device 108, may make a selection of a content item when browsing a listing of content items in the program guide. As shown in FIG. 5A, the user may select a content item labeled "Show 1" via the program guide. The user device may send an indication of the selection of Show 1 to a computing device, such as the server 102, and/or the one or more content sources 103,105.

The computing device may determine whether a predetermined accessibility score for Show 1 exists or whether a predicted accessibility score for Show 1 was previously determined. If the computing device determines that a predetermined accessibility score for Show 1 does not exist or that a predicted accessibility score for Show 1 has not already been determined, then the computing device may cause a predicted accessibility score to be determined. For example, the computing device may provide the indication of the selection of Show 1 to a trained prediction model (e.g., the prediction model 330). The trained prediction model may be resident at, or otherwise controlled by, the computing device. For example, the trained prediction model may reside on (e.g., execute on) a server (e.g., in the cloud or at a remote location with respect to the computing device), and the computing device may be in communication with the server and/or a network to which the server belongs. The trained prediction model may retrieve/request a file containing Show 1 for analysis (e.g., from a video cache). The trained prediction model may analyze the file containing Show 1 and determine (e.g., extract) one or more multimodal features that are present within Show 1. In some examples, Show 1 may be an episode/installment of a linear content item, such as a live broadcast, and the trained prediction model may retrieve/request a file indicating one or more multimodal features that are typically present within the episodes/installments of Show 1 (e.g., based on analysis of historical episodes/installments). The trained prediction model may determine a predicted accessibility score for Show 1 based on the one or more multimodal features. The computing device may receive the predicted accessibility score via the trained prediction model. The computing device may send the predicted accessibility score to the user device.

As shown in FIG. 5A, the program guide may provide a first window 502A and a second window 504A. At or near the same time the user device receives the predicted accessibility score for Show 1, the program guide may provide Show 1 in the first window 502A and information regarding Show 1 in the second window 504A. For example, the predicted accessibility score for Show 1 may be output (e.g., displayed) as part of the information regarding Show 1 in the second window 504A. The predicted accessibility score may be output (e.g., displayed) as a percentage (e.g., 85%), a letter rating (e.g., B+), a graphical representation (e.g., 3.5 stars/icons out of 4), an indication of a comparison of the predicted accessibility score against a known, or predicted, accessibility score for another content item (e.g., a comparison of the predicted accessibility score to an accessibility score for a previously viewed content item), a combination thereof, and/or the like. The predicted accessibility score may be provided as an audio message. The audio message may be emitted by the user device. The audio message may provide the predicted accessibility score as a percentage (e.g., "The accessibility score for this movie is 85%"), a letter rating (e.g., "This movie is rated 'B+' for accessibility"), a numerical rating (e.g., "This movie is rated '3.5 stars out of 4' for accessibility"), an indication of a comparison of the predicted accessibility score against a known, or predicted, accessibility score for another content item (e.g., "This movie is rated higher for accessibility than the movie you watched last night"), a combination thereof, and/or the like. As shown in the second window 504A, the predicted accessibility score may be output (e.g., displayed) as two separate scores—one related to accessibility for "Hearing Impaired" persons and another related to accessibility for "Visually Impaired" persons. For example, Show 1 may be a news program, which may contain a multimodal feature relating to on-screen text (e.g., text overlays, chyrons, etc.). The news program may contain a large amount of on-screen text (e.g., as indicated by a corresponding multimodal detector for on-screen text analysis) that makes the news program less accessible to a visually impaired person as compared to other content items. The predicted accessibility score for "Visually Impaired" persons for Show 1 may be 2 out of 4.

Figure 5B:
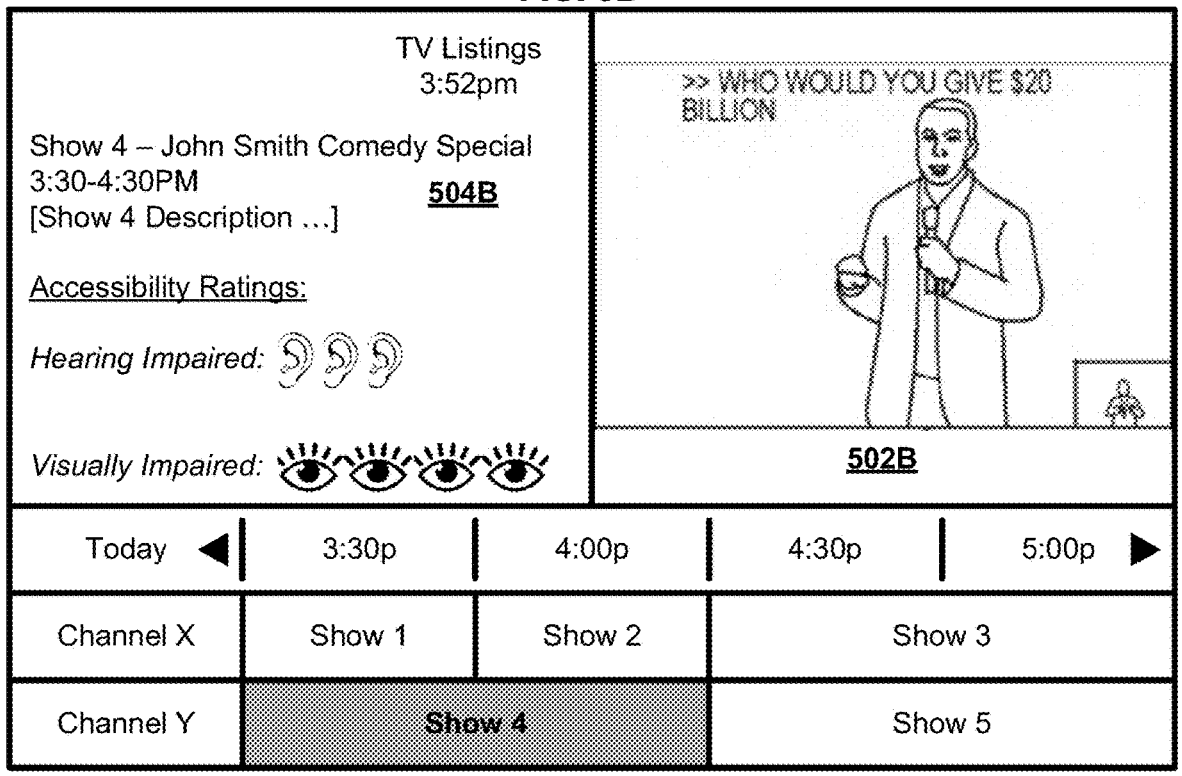

Turning now to FIG. 5B, a second view 501 of the program guide is shown. As shown in FIG. 5B, the user may select a content item labeled "Show 4" via the program guide. The user device may send an indication of the selection of Show 4 to the computing device. The computing device may determine whether a predetermined accessibility score for Show 4 exists or whether a predicted accessibility score for Show 4 was previously determined. If the computing device determines that a predetermined accessibility score for Show 4 does not exist or that a predicted accessibility score for Show 4 has not already been determined, then the computing device may cause a predicted accessibility score to be determined. For example, the computing device may provide the indication of the selection of Show 4 to the trained prediction model. The trained prediction model may retrieve/request a file containing Show 4 for analysis (e.g., from a video cache). The trained prediction model may analyze the file containing Show 4 and determine (e.g., extract) one or more multimodal features that are present within Show 1. In some examples, Show 4 may be a non-linear content item, such as an on-demand content item. The trained prediction model may determine a predicted accessibility score for Show 4 based on the one or more multimodal features. The computing device may receive the predicted accessibility score for Show 4 via the trained prediction model. The computing device may send the predicted accessibility score for Show 4 to the user device.

As shown in FIG. 5B, the program guide may provide a first window 502B and a second window 504B. At or near the same time the user device receives the predicted accessibility score for Show 4, the program guide may provide Show 4 in the first window 502B and information regarding Show 4 in the second window 504B. For example, the predicted accessibility score for Show 4 may be output (e.g., displayed and/or provided as an audio message) as part of the information regarding Show 4 in the second window 504B. The predicted accessibility score may be output (e.g., displayed) as a percentage (e.g., 85%), a letter rating (e.g., B+), a graphical representation (e.g., 3.5 stars/icons out of 4), an indication of a comparison of the predicted accessibility score against a known, or predicted, accessibility score for another content item (e.g., a comparison of the predicted accessibility score to an accessibility score for a previously viewed content item), a combination thereof, and/or the like. The predicted accessibility score may be provided as an audio message. The audio message may be emitted by the user device. The audio message may provide the predicted accessibility score as a percentage (e.g., "The accessibility score for this movie is 85%"), a letter rating (e.g., "This movie is rated 'B+' for accessibility"), a numerical rating (e.g., "This movie is rated '3.5 stars out of 4' for accessibility"), an indication of a comparison of the predicted accessibility score against a known, or predicted, accessibility score for another content item (e.g., "This movie is rated higher for accessibility than the movie you watched last night"), a combination thereof, and/or the like. As shown in the second window 504B, the predicted accessibility score for Show 4 may be output (e.g., displayed) as two separate scores—one related to accessibility for "Hearing Impaired" persons and another related to accessibility for "Visually Impaired" persons. For example, Show 4 may be a stand-up comedy special, which may contain a multimodal feature relating to number of characters per scene. The stand-up comedy special may only have one character (e.g., the comedian) in each scene (e.g., as indicated by a multimodal detector for facial recognition) such that the stand-up comedy special may be more accessible to a visually impaired person as compared to the news program. The predicted accessibility score for "Visually Impaired" persons for Show 4 may be 4 out of 4.

Figure 6:
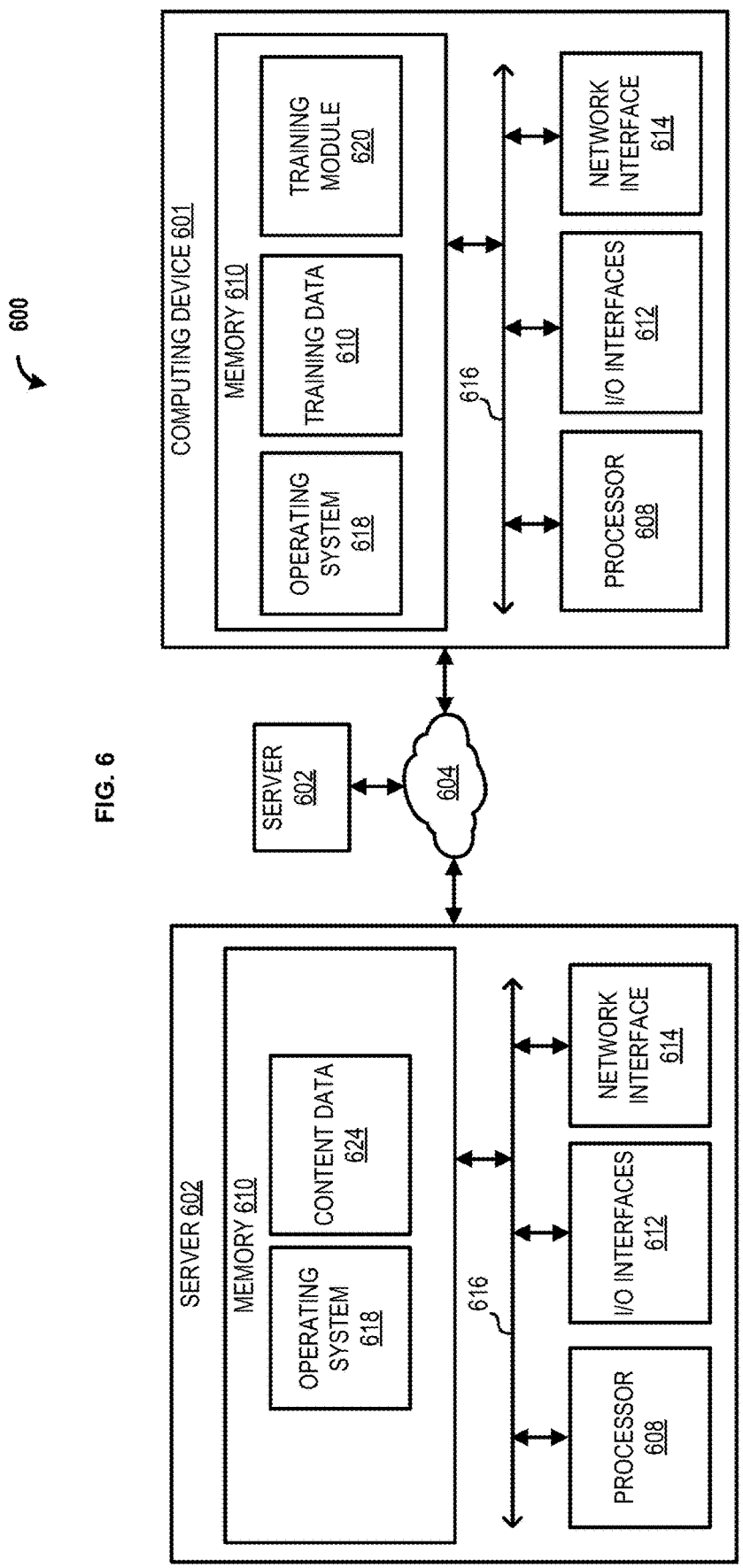
FIG. 6 shows an example system.

As discussed herein, the present methods and systems may be computer-implemented. FIG. 6 shows a block diagram depicting an environment 600 comprising non-limiting examples of a computing device 601 and a server 602 connected through a network 604, such as the network 106. The computing device 601 and/or the server 602 may be any one of the first user device 104, the second user device 108, the server 102, and/or the one or more content sources 103,105 of FIG. 1. In an aspect, some or all steps of any described method herein may be performed on a computing device as described herein. The computing device 601 can comprise one or multiple computers configured to store one or more of the training module 320, training data 410, and the like. The server 602 can comprise one or multiple computers configured to store content data 624 (e.g., a plurality of content items and associated accessibility scores and/or multimodal features). Multiple servers 602 can communicate with the computing device 601 via the through the network 604.

The computing device 601 and the server 602 may each be a digital computer that, in terms of hardware architecture, generally includes a processor 608, memory system 610, input/output (I/O) interfaces 612, and network interfaces 614. These components (608, 610, 612, and 614) are communicatively coupled via a local interface 616. The local interface 616 can be, for example, but not limited to, one or more buses or other wired or wireless connections, as is known in the art. The local interface 616 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 608 can be a hardware device for executing software, particularly that stored in memory system 610. The processor 608 can be any custom made or commercially available processor, a central processing unit (CPU), an auxiliary processor among several processors associated with the computing device 601 and the server 602, a semiconductor-based microprocessor (in the form of a microchip or chip set), or generally any device for executing software instructions. When the computing device 601 and/or the server 602 is in operation, the processor 608 can be configured to execute software stored within the memory system 610, to communicate data to and from the memory system 610, and to generally control operations of the computing device 601 and the server 602 pursuant to the software.

The I/O interfaces 612 can be used to receive user input from, and/or for providing system output to, one or more devices or components. User input can be provided via, for example, a keyboard and/or a mouse. System output can be provided via a display device and a printer (not shown). I/O interfaces 612 can include, for example, a serial port, a parallel port, a Small Computer System Interface (SCSI), an infrared (IR) interface, a radio frequency (RF) interface, and/or a universal serial bus (USB) interface.

The network interface 614 can be used to transmit and receive from the computing device 601 and/or the server 602 on the network 604. The network interface 614 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 614 may include address, control, and/or data connections to enable appropriate communications on the network 604.

The memory system 610 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 610 may incorporate electronic, magnetic, optical, and/or other types of storage media. Note that the memory system 610 can have a distributed architecture, where various components are situated remote from one another, but can be accessed by the processor 608.

The software in memory system 610 may include one or more software programs, each of which comprises an ordered listing of executable instructions for implementing logical functions. In the example of FIG. 6, the software in the memory system 610 of the computing device 601 can comprise the training module 320 (or subcomponents thereof), the training data 320, and a suitable operating system (O/S) 618. In the example of FIG. 6, the software in the memory system 610 of the server 602 can comprise, the content data 624, and a suitable operating system (O/S) 618. The operating system 618 essentially controls the execution of other computer programs and provides scheduling, input-output control, file and data management, memory management, and communication control and related services.

For purposes of illustration, application programs and other executable program components such as the operating system 618 are illustrated herein as discrete blocks, although it is recognized that such programs and components can reside at various times in different storage components of the computing device 601 and/or the server 602. An implementation of the training module 320 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Turning now to FIG. 7, a flowchart of an example method 700 for improved accessibility scoring for content items is shown. The method 700 may be performed in whole or in part by a single computing device, a plurality of computing devices, and the like. For example, the first user device 104, the second user device 108, the server 102, and/or the one or more content sources 103,105 of the system 100 may be configured to perform the method 700. As another example, the training module 320 or the prediction module 330 of the system 300 may be configured to perform the method 700. As a further example, the computing device 601 or the server 602 of the system 600 may be configured to perform the method 700.

At step 702, a computing device may receive first data. The first data may be received from another computing device. The first data may be associated with a plurality of content items, such as video content items. The first data may comprise an accessibility score for each content item of the plurality of content items. At step 704, the computing device may determine a plurality of multimodal features. The plurality of multimodal features may be determined based on the first data (e.g., based on the plurality of content items). The plurality of multimodal features may be determined by the computing device for use in training a prediction model. Each content item of the plurality of content items may comprise one or more of the plurality of multimodal features. The plurality of multimodal features may include video features (e.g., based on video/image analysis), audio features (e.g., based on audio analysis), text-based features (e.g., based on closed-captioning analysis), features indicated by metadata (e.g., duration, genre, etc.), a combination thereof, and/or the like. The computing device may use one or more multimodal detectors to determine the one or more multimodal features that are present within each content item. The one or more multimodal detectors may be resident on, or other otherwise controlled by, the computing device.

At step 706, the computing device may train the prediction model. For example, the computing device may train the prediction model based on the first data and the plurality of multimodal features. The prediction model may be trained according to a training process, such as one or more steps of the method 400 described herein. As described herein, the first data may comprise an accessibility score for each content item of the plurality of content items. The accessibility scores may be predetermined accessibility scores based on survey scores, review scores, etc., collected from multiple types of viewers of the plurality of content items.

Some, or all, of the plurality of video content items may include an audio description track, such as audio related to secondary audio programming (SAP), the American Council of the Blind's Audio Description Project (ADP), and/or the like. The audio description track for a content item may provide narration regarding visual elements of the content item. The predetermined accessibility score for a content item having an audio description track may be based on a usage of the audio description track. For example, the predetermined accessibility score may be based on a ratio (e.g., a percentage, a fraction, etc.) of a quantity of viewers of the content item that enable the audio description track as compared to a quantity of total viewers of the content item. The predetermined accessibility score may be based on a quantity of viewers of the content item that enable the audio description track that meet or exceed a threshold.

The multiple types of viewers may be persons who are visually impaired, persons who are hearing impaired, persons who are cognitively impaired, etc., as well as persons who desire to view content that requires less visual attention and/or audio attention as the case may be. Each of the plurality of multimodal features may differ within each of the plurality of content items. For example, a first content item may include one or more multimodal features that are not present at all—or are present to a lesser degree—within another content item (e.g., a documentary film may have 40% more dialogue than a Sci-Fi film). The predetermined accessibility scores may be used as the "ground truth" regarding which of the plurality of multimodal features are most correlative with a high accessibility score or with a low accessibility score based on the type of viewer. For example, depending on which of the plurality of multimodal features are present within a first content item, the predetermined accessibility score for the first content item provided by a visually impaired person may differ greatly from the predetermined accessibility score for the first video content item provided by a hearing impaired person.

The plurality of multimodal features and the predetermined accessibility score for each of the plurality of content items may be used to train the prediction model. At step 708, the computing device may output the trained prediction model. For example, the trained prediction model may be output by the computing device and provided to another computing device(s), such a server(s) and/or a user device(s). The trained prediction model may be configured to provide a predicted accessibility score for a further content item (e.g., a video content item). The further content item may be a content item that is not part of the plurality of content items that were used to train the prediction model. The predicted accessibility score for the further content item may indicate how accessible the further content item may be for persons who are visually impaired, hearing impaired, cognitively impaired, etc., as well as for persons who desire to view content that requires less visual attention and/or audio attention as the case may be.

A user of a user device may make a selection of the further content item, such as when browsing content items in a program guide. The user device may send second data to the computing device. The second data may include an indication of the selection of the further content item. The computing device may receive the second data. At step 710, the computing device may cause the second data to be provided to the trained prediction model. The trained prediction model may retrieve the further content item for analysis (e.g., from a video cache) based on the second data. The trained prediction model may analyze the further content item and determine (e.g., extract) one or more multimodal features of the plurality of multimodal features that are present within the further content item. For example, the trained predication model may use one or more multimodal detectors to determine the one or more multimodal features that are present within the further content item. At step 712, the trained prediction model may determine a predicted accessibility score for the further content item. For example, the trained prediction model may determine the predicted accessibility score for the further content item based on the one or more multimodal features present within the further content item. At step 714, the computing device may send the predicted accessibility score. For example, the computing device may send the predicted accessibility score to the user device. The user device may receive the predicted accessibility score. At step 716, the user device may cause the predicted accessibility score to be output (e.g., displayed). For example, the user device may cause the predicted accessibility score to be output. For example, the user device may cause the predicted accessibility score to be output (e.g., displayed) as part of a description of the further content item within the program guide. The predicted accessibility score may be output (e.g., displayed) as a percentage (e.g., 85%), a letter rating (e.g., B+), a graphical representation (e.g., 3.5 stars/icons out of 4), an indication of a comparison of the predicted accessibility score against a known, or predicted, accessibility score for another content item (e.g., a comparison of the predicted accessibility score to an accessibility score for a previously viewed content item), a combination thereof, and/or the like. The predicted accessibility score may be provided as an audio message. The audio message may be emitted by the user device. The audio message may provide the predicted accessibility score as a percentage (e.g., "The accessibility score for this movie is 85%"), a letter rating (e.g., "This movie is rated 'B+' for accessibility"), a numerical rating (e.g., "This movie is rated '3.5 stars out of 4' for accessibility"), an indication of a comparison of the predicted accessibility score against a known, or predicted, accessibility score for another content item (e.g., "This movie is rated higher for accessibility than the movie you watched last night"), a combination thereof, and/or the like.

Turning now to FIG. 8, a flowchart of an example method 800 for improved accessibility scoring for content items is shown. The method 800 may be performed in whole or in part by a single computing device, a user device, a plurality of computing/user devices, and/or the like. For example, the server 102, and/or the one or more content sources 103,105 of the system 100 may be configured to perform the method 800. As another example, the training module 320 or the prediction module 330 of the system 300 may be configured to perform the method 800. As a further example, the computing device 601 or the server 602 of the system 600 may be configured to perform the method 800.

A user of a user device may make a selection of a content item, such as a video content item. The user of the user device may make the selection when browsing content items in a program guide. The user device may send first data to a computing device, such as server of a content distribution network (CDN). The first data may include an indication of the selection of the content item. At step 802, the computing device may receive the first data. The content item may comprise one or more multimodal features, such as video features (e.g., based on video/image analysis), audio features (e.g., based on audio analysis), text-based features (e.g., based on closed-captioning analysis), features indicated by metadata (e.g., duration, genre, etc.), a combination thereof, and/or the like. The computing device may determine whether a predetermined accessibility score for the content item exists or whether a predicted accessibility score for the content item was previously determined. The user device may comprise the computing device. For example, the computing device may be a module that is part of the user device. In such an example, the first data sent at step 802 may be simply sent (e.g., transmitted internally) to the module of the user device referred to herein as the computing device.

A prediction model may be trained by the computing device. For example, the computing device may receive training data. The training data may be received from another computing device. The training data may be associated with a plurality of content items, such as video content items. The training data may comprise an accessibility score for each content item of the plurality of content items. The computing device may determine a plurality of multimodal features. The plurality of multimodal features may be determined based on the training data (e.g., based on the plurality of content items). The plurality of multimodal features may be determined by the computing device for use in training the prediction model. Each content item of the plurality of content items may comprise one or more of the plurality of multimodal features. The plurality of multimodal features may include video features (e.g., based on video/image analysis), audio features (e.g., based on audio analysis), text-based features (e.g., based on closed-captioning analysis), features indicated by metadata (e.g., duration, genre, etc.), a combination thereof, and/or the like.

The computing device may train the prediction model based on the training data and the plurality of multimodal features. The prediction model may be trained according to a training process, such as one or more steps of the method 400 described herein. The training data may comprise an accessibility score for each content item of the plurality of content items. The accessibility scores may be predetermined accessibility scores based on survey scores, review scores, etc., collected from multiple types of viewers of the plurality of content items.

Some, or all of the plurality of video content items may include an audio description track, such as audio related to secondary audio programming (SAP), the American Council of the Blind's Audio Description Project (ADP), and/or the like. The audio description track for a content item may provide narration regarding visual elements of the content item. The predetermined accessibility score for a content item having an audio description track may be based on a usage of the audio description track. For example, the predetermined accessibility score may be based on a ratio (e.g., a percentage, a fraction, etc.) of a quantity of viewers of the content item that enable the audio description track as compared to a quantity of total viewers of the content item. The predetermined accessibility score may be based on a quantity of viewers of the content item that enable the audio description track that meet or exceed a threshold.

The multiple types of viewers may be persons who are visually impaired, persons who are hearing impaired, persons who are cognitively impaired, etc., as well as persons who desire to view content that requires less visual attention and/or audio attention as the case may be. Each of the plurality of multimodal features may differ within each of the plurality of content items. For example, a first content item may include one or more multimodal features that are not present at all—or are present to a lesser degree—within another content item (e.g., a documentary film may have 40% more dialogue than a Sci-Fi film). The predetermined accessibility scores may be used as the "ground truth" regarding which of the plurality of multimodal features are most correlative with a high accessibility score or with a low accessibility score based on the type of viewer. For example, depending on which of the plurality of multimodal features are present within a first content item, the predetermined accessibility score for the first content item provided by a visually impaired person may differ greatly from the predetermined accessibility score for the first video content item provided by a hearing impaired person. The plurality of multimodal features and the predetermined accessibility score for each of the plurality of content items may be used to train the prediction model.

At step 804, the computing device may cause the content item to be provided to the trained prediction model. For example, the computing device may cause the content item to be provided to the trained prediction model if the computing device determines that a predetermined accessibility score for the content item does not exist or that a predicted accessibility score for the content item has not already been determined. The trained prediction model may be resident on, or other otherwise controlled by, the computing user device. The trained prediction model may retrieve the content item for analysis (e.g., from a video cache) based on the second data. The trained prediction model may analyze the content item and determine (e.g., extract) the one or more multimodal features that are present within the content item. For example, the trained predication model may use one or more multimodal detectors to determine the one or more multimodal features that are present within the content item. The one or more multimodal detectors may be resident on, or other otherwise controlled by, the computing device.

At step 806, a predicted accessibility score for the further content item may be determined. The predicted accessibility score for the further content item may be determined by the trained prediction model. For example, the trained prediction model may determine the predicted accessibility score for the content item based on the one or more multimodal features present within the content item. The computing device may send the predicted accessibility score. For example, the computing device may send the predicted accessibility score to the user device. As noted above, the computing device may be a module that is part of the user device. In such an example, the predicted accessibility score sent at step 806 may be simply sent (e.g., transmitted internally) from the module of the user device referred to herein as the computing device to a module of the user device that may be used to output the predicted accessibility score (e.g., a display module, screen, etc.). The user device may receive the predicted accessibility score. The user device may cause the predicted accessibility score to be output. For example, the user device may cause the predicted accessibility score to be output (e.g., displayed) as part of a description of the content item within the program guide. The predicted accessibility score may be output (e.g., displayed) as a percentage (e.g., 85%), a letter rating (e.g., B+), a graphical representation (e.g., 3.5 stars/icons out of 4), an indication of a comparison of the predicted accessibility score against a known, or predicted, accessibility score for another content item (e.g., a comparison of the predicted accessibility score to an accessibility score for a previously viewed content item), a combination thereof, and/or the like. The predicted accessibility score may be provided as an audio message. The audio message may be emitted by the user device. The audio message may provide the predicted accessibility score as a percentage (e.g., "The accessibility score for this movie is 85%"), a letter rating (e.g., "This movie is rated 'B+' for accessibility"), a numerical rating (e.g., "This movie is rated '3.5 stars out of 4' for accessibility"), an indication of a comparison of the predicted accessibility score against a known, or predicted, accessibility score for another content item (e.g., "This movie is rated higher for accessibility than the movie you watched last night"), a combination thereof, and/or the like.

Turning now to FIG. 9, a flowchart of an example method 900 for improved accessibility scoring for content items is shown. The method 900 may be performed in whole or in part by a single computing device, a plurality of computing devices, and the like. For example, the server 102, and/or the one or more content sources 103,105 of the system 100 may be configured to perform the method 900. As another example, the training module 320 or the prediction module 330 of the system 300 may be configured to perform the method 700. As a further example, the computing device 601 or the server 602 of the system 600 may be configured to perform the method 900.

At step 902, a computing device may receive first data. The first data may be received from another computing device. The first data may be associated with a plurality of content items, such as video content items. The first data may comprise an accessibility score for each content item of the plurality of content items. At step 904, the computing device may determine a plurality of multimodal features. The plurality of multimodal features may be determined based on the first data (e.g., based on the plurality of content items). The plurality of multimodal features may be determined by the computing device for use in training a prediction model. Each content item of the plurality of content items may comprise one or more of the plurality of multimodal features. The plurality of multimodal features may include video features (e.g., based on video/image analysis), audio features (e.g., based on audio analysis), text-based features (e.g., based on closed-captioning analysis), features indicated by metadata (e.g., duration, genre, etc.), a combination thereof, and/or the like. The computing device may use one or more multimodal detectors to determine the one or more multimodal features that are present within each content item. The one or more multimodal detectors may be resident on, or other otherwise controlled by, the computing device.

At step 906, the computing device may train the prediction model. For example, the computing device may train the prediction model based on the first data and the plurality of multimodal features. The prediction model may be trained according to a training process, such as one or more steps of the method 400 described herein. As described herein, the first data may comprise an accessibility score for each content item of the plurality of content items. The accessibility scores may be predetermined accessibility scores based on survey scores, review scores, etc., collected from multiple types of viewers of the plurality of content items.

Some, or all of the plurality of video content items may include an audio description track, such as audio related to secondary audio programming (SAP), the American Council of the Blind's Audio Description Project (ADP), and/or the like. The audio description track for a content item may provide narration regarding visual elements of the content item. The predetermined accessibility score for a content item having an audio description track may be based on a usage of the audio description track. For example, the predetermined accessibility score may be based on a ratio (e.g., a percentage, a fraction, etc.) of a quantity of viewers of the content item that enable the audio description track as compared to a quantity of total viewers of the content item. The predetermined accessibility score may be based on a quantity of viewers of the content item that enable the audio description track that meet or exceed a threshold.

The multiple types of viewers may be persons who are visually impaired, persons who are hearing impaired, persons who are cognitively impaired, etc., as well as persons who desire to view content that requires less visual attention and/or audio attention as the case may be. Each of the plurality of multimodal features may differ within each of the plurality of content items. For example, a first content item may include one or more multimodal features that are not present at all—or are present to a lesser degree—within another content item (e.g., a documentary film may have 40% more dialogue than a Sci-Fi film). The predetermined accessibility scores may be used as the "ground truth" regarding which of the plurality of multimodal features are most correlative with a high accessibility score or with a low accessibility score based on the type of viewer. For example, depending on which of the plurality of multimodal features are present within a first content item, the predetermined accessibility score for the first content item provided by a visually impaired person may differ greatly from the predetermined accessibility score for the first video content item provided by a hearing impaired person.

The plurality of multimodal features and the predetermined accessibility score for each of the plurality of content items may be used to train the prediction model. At step 908, the computing device may output the trained prediction model. For example, the trained prediction model may be output by the computing device and provided to another computing device(s), such as a server(s) and/or a user device(s). The trained prediction model may be configured to provide a predicted accessibility score for a further content item (e.g., a video content item). The further content item may be a content item that is not part of the plurality of content items that were used to train the prediction model. The predicted accessibility score for the further content item may indicate how accessible the further content item may be for persons who are visually impaired, hearing impaired, cognitively impaired, etc., as well as for persons who desire to view content that requires less visual attention and/or audio attention as the case may be.

A user of a user device may make a selection of the further content item, such as when browsing content items in a program guide. The user device may send second data to the computing device. The second data may include an indication of the selection of the further content item. The computing device may receive the second data. The computing device may cause the second data to be provided to the trained prediction model. The trained prediction model may retrieve the further content item for analysis (e.g., from a video cache) based on the second data. The trained prediction model may analyze the further content item and determine (e.g., extract) one or more multimodal features of the plurality of multimodal features that are present within the further content item. For example, the trained predication model may use one or more multimodal detectors to determine the one or more multimodal features that are present within the further content item. The trained prediction model may determine a predicted accessibility score for the further content item. For example, the trained prediction model may determine the predicted accessibility score for the further content item based on the one or more multimodal features present within the further content item. The computing device may send the predicted accessibility score. For example, the computing device may send the predicted accessibility score to the user device.

The user device may receive the predicted accessibility score. The user device may cause the predicted accessibility score to be output. For example, the user device may cause the predicted accessibility score to be output (e.g., displayed) as part of a description of the further content item within the program guide. The predicted accessibility score may be output (e.g., displayed) as a percentage (e.g., 85%), a letter rating (e.g., B+), a graphical representation (e.g., 3.5 stars/icons out of 4), an indication of a comparison of the predicted accessibility score against a known, or predicted, accessibility score for another content item (e.g., a comparison of the predicted accessibility score to an accessibility score for a previously viewed content item), a combination thereof, and/or the like. The predicted accessibility score may be provided as an audio message. The audio message may be emitted by the user device. The audio message may provide the predicted accessibility score as a percentage (e.g., "The accessibility score for this movie is 85%"), a letter rating (e.g., "This movie is rated 'B+' for accessibility"), a numerical rating (e.g., "This movie is rated '3.5 stars out of 4' for accessibility"), an indication of a comparison of the predicted accessibility score against a known, or predicted, accessibility score for another content item (e.g., "This movie is rated higher for accessibility than the movie you watched last night"), a combination thereof, and/or the like.

Turning now to FIG. 10, a flowchart of an example method 1000 for improved accessibility scoring for content items is shown. The method 1000 may be performed in whole or in part by a single computing device, a plurality of computing devices, and the like. For example, a computing device such as the first user device 104 or the second user device 108 may be configured to perform the method 1000.

At step 1002, a first computing device may receive a selection of a content item, such as a video content item. The selection of the content item may be made by a user of the first computing device. For example, the user of the first computing device may make the selection of the content item when browsing content items in a program guide. The program guide may be provided by the first computing device. At step 1004, the first computing device may send an indication of the selection of the content item. For example, the first computing device may send the indication of the selection of the content item to a second computing device, such as server of a content distribution network (CDN). The second computing device may receive the indication of the selection of the content item. The content item may comprise one or more multimodal features, such as video features (e.g., based on video/image analysis), audio features (e.g., based on audio analysis), text-based features (e.g., based on closed-captioning analysis), features indicated by metadata (e.g., duration, genre, etc.), a combination thereof, and/or the like. The second computing device may determine whether a predetermined accessibility score for the content item exists or whether a predicted accessibility score for the content item was previously determined.

A prediction model may be trained by the second computing device. For example, the second computing device may receive training data. The training data may be received from another computing device, such as another server of the CDN. The training data may be associated with a plurality of content items, such as video content items. The training data may comprise an accessibility score for each content item of the plurality of content items. The second computing device may determine a plurality of multimodal features. The plurality of multimodal features may be determined based on the training data (e.g., based on the plurality of content items). The plurality of multimodal features may be determined by the second computing device for use in training the prediction model. Each content item of the plurality of content items may comprise one or more of the plurality of multimodal features. The plurality of multimodal features may include video features (e.g., based on video/image analysis), audio features (e.g., based on audio analysis), text-based features (e.g., based on closed-captioning analysis), features indicated by metadata (e.g., duration, genre, etc.), a combination thereof, and/or the like.

The second computing device may train the prediction model based on the training data and the plurality of multimodal features. The prediction model may be trained according to a training process, such as one or more steps of the method 400 described herein. The training data may comprise an accessibility score for each content item of the plurality of content items. The accessibility scores may be predetermined accessibility scores based on survey scores, review scores, etc., collected from multiple types of viewers of the plurality of content items.

Some, or all of the plurality of video content items may include an audio description track, such as audio related to secondary audio programming (SAP), the American Council of the Blind's Audio Description Project (ADP), and/or the like. The audio description track for a content item may provide narration regarding visual elements of the content item. The predetermined accessibility score for a content item having an audio description track may be based on a usage of the audio description track. For example, the predetermined accessibility score may be based on a ratio (e.g., a percentage, a fraction, etc.) of a quantity of viewers of the content item that enable the audio description track as compared to a quantity of total viewers of the content item. The predetermined accessibility score may be based on a quantity of viewers of the content item that enable the audio description track that meet or exceed a threshold.

The multiple types of viewers may be persons who are visually impaired, persons who are hearing impaired, persons who are cognitively impaired, etc., as well as persons who desire to view content that requires less visual attention and/or audio attention as the case may be. Each of the plurality of multimodal features may differ within each of the plurality of content items. For example, a first content item may include one or more multimodal features that are not present at all—or are present to a lesser degree—within another content item (e.g., a documentary film may have 40% more dialogue than a Sci-Fi film). The predetermined accessibility scores may be used as the "ground truth" regarding which of the plurality of multimodal features are most correlative with a high accessibility score or with a low accessibility score based on the type of viewer. For example, depending on which of the plurality of multimodal features are present within a first content item, the predetermined accessibility score for the first content item provided by a visually impaired person may differ greatly from the predetermined accessibility score for the first video content item provided by a hearing impaired person. The plurality of multimodal features and the predetermined accessibility score for each of the plurality of content items may be used to train the prediction model.

The second computing device may cause the content item to be provided to the trained prediction model. For example, the second computing device may cause the content item to be provided to the trained prediction model if the second computing device determines that a predetermined accessibility score for the content item does not exist or that a predicted accessibility score for the content item has not already been determined. The trained prediction model may be resident on, or other otherwise controlled by, the second computing user device. The trained prediction model may retrieve the content item for analysis (e.g., from a video cache) based on the second data. The trained prediction model may analyze the content item and determine (e.g., extract) the one or more multimodal features that are present within the content item. For example, the trained predication model may use one or more multimodal detectors to determine the one or more multimodal features that are present within the content item. The one or more multimodal detectors may be resident on, or other otherwise controlled by, the second computing device.

The trained prediction model may determine a predicted accessibility score for the further content item. For example, the trained prediction model may determine the predicted accessibility score for the content item based on the one or more multimodal features present within the content item. At step 1006, the first computing device may receive the predicted accessibility score. For example, the trained prediction model and/or the second computing device may send the predicted accessibility score to the first computing device. At step 1008, the first computing device may cause the predicted accessibility score to be output. For example, the first computing device may cause the predicted accessibility score to be output (e.g., displayed) as part of a description of the content item within the program guide. The predicted accessibility score may be output (e.g., displayed) as a percentage (e.g., 85%), a letter rating (e.g., B+), a graphical representation (e.g., 3.5 stars/icons out of 4), an indication of a comparison of the predicted accessibility score against a known, or predicted, accessibility score for another content item (e.g., a comparison of the predicted accessibility score to an accessibility score for a previously viewed content item), a combination thereof, and/or the like. The predicted accessibility score may be provided as an audio message. The audio message may be emitted by the first computing device. The audio message may provide the predicted accessibility score as a percentage (e.g., "The accessibility score for this movie is 85%"), a letter rating (e.g., "This movie is rated 'B+' for accessibility"), a numerical rating (e.g., "This movie is rated '3.5 stars out of 4' for accessibility"), an indication of a comparison of the predicted accessibility score against a known, or predicted, accessibility score for another content item (e.g., "This movie is rated higher for accessibility than the movie you watched last night"), a combination thereof, and/or the like.

Turning now to FIG. 11, a flowchart of an example method 1100 for improved accessibility scoring for content items is shown. The method 1100 may be performed in whole or in part by a single computing device, a plurality of computing devices, and the like. For example, the server 102, and/or the one or more content sources 103,105 of the system 100 may be configured to perform the method 1100. As another example, the training module 320 or the prediction module 330 of the system 300 may be configured to perform the method 1100. As a further example, the computing device 601 or the server 602 of the system 600 may be configured to perform the method 1100.

A user of a user device may make a selection of a content item, such as a video content item. The user of the user device may make the selection when browsing content items in a program guide. The user device may send first data to a computing device, such as server of a content distribution network (CDN). The first data may include an indication of the selection of the content item. At step 1102, the computing device may receive the indication of the selection of the content item. The user device may comprise the computing device. For example, the computing device may be a module that is part of the user device. In such an example, the first data sent at step 1102 may be simply sent (e.g., transmitted internally) to the module of the user device referred to herein as the computing device. The content item may comprise one or more multimodal features, such as video features (e.g., based on video/image analysis), audio features (e.g., based on audio analysis), text-based features (e.g., based on closed-captioning analysis), features indicated by metadata (e.g., duration, genre, etc.), a combination thereof, and/or the like. The computing device may determine whether a predetermined accessibility score for the content item exists or whether a predicted accessibility score for the content item was previously determined.

A prediction model may be trained by the computing device. For example, the computing device may receive training data. The training data may be received from another computing device. The training data may be associated with a plurality of content items, such as video content items. The training data may comprise an accessibility score for each content item of the plurality of content items. The computing device may determine a plurality of multimodal features. The plurality of multimodal features may be determined based on the training data (e.g., based on the plurality of content items). The plurality of multimodal features may be determined by the computing device for use in training the prediction model. Each content item of the plurality of content items may comprise one or more of the plurality of multimodal features. The plurality of multimodal features may include video features (e.g., based on video/image analysis), audio features (e.g., based on audio analysis), text-based features (e.g., based on closed-captioning analysis), features indicated by metadata (e.g., duration, genre, etc.), a combination thereof, and/or the like.

The computing device may train the prediction model based on the training data and the plurality of multimodal features. The prediction model may be trained according to a training process, such as one or more steps of the method 400 described herein. The training data may comprise an accessibility score for each content item of the plurality of content items. The accessibility scores may be predetermined accessibility scores based on survey scores, review scores, etc., collected from multiple types of viewers of the plurality of content items.

Some, or all of the plurality of video content items may include an audio description track, such as audio related to secondary audio programming (SAP), the American Council of the Blind's Audio Description Project (ADP), and/or the like. The audio description track for a content item may provide narration regarding visual elements of the content item. The predetermined accessibility score for a content item having an audio description track may be based on a usage of the audio description track. For example, the predetermined accessibility score may be based on a ratio (e.g., a percentage, a fraction, etc.) of a quantity of viewers of the content item that enable the audio description track as compared to a quantity of total viewers of the content item. The predetermined accessibility score may be based on a quantity of viewers of the content item that enable the audio description track that meet or exceed a threshold.

The multiple types of viewers may be persons who are visually impaired, persons who are hearing impaired, persons who are cognitively impaired, etc., as well as for persons who desire to view content that requires less visual attention and/or audio attention as the case may be. Each of the plurality of multimodal features may differ within each of the plurality of content items. For example, a first content item may include one or more multimodal features that are not present at all—or are present to a lesser degree—within another content item (e.g., a documentary film may have 40% more dialogue than a Sci-Fi film). The predetermined accessibility scores may be used as the "ground truth" regarding which of the plurality of multimodal features are most correlative with a high accessibility score or with a low accessibility score based on the type of viewer. For example, depending on which of the plurality of multimodal features are present within a first content item, the predetermined accessibility score for the first content item provided by a visually impaired person may differ greatly from the predetermined accessibility score for the first video content item provided by a hearing impaired person. The plurality of multimodal features and the predetermined accessibility score for each of the plurality of content items may be used to train the prediction model.

At step 1104, the computing device may retrieve the content item. For example, the computing device may retrieve a file comprising the content item if the computing device determines that a predetermined accessibility score for the content item does not exist or that a predicted accessibility score for the content item has not already been determined. At step 1106, the computing device cause the content item to be provided to the trained prediction model. The trained prediction model may be resident on, or other otherwise controlled by, the computing user device. The trained prediction model may retrieve the content item for analysis (e.g., from a video cache) based on the second data. At step 1108, one or more multimodal features associated with the content item may be determined. For example, the trained prediction model may analyze the content item and determine (e.g., extract) the one or more multimodal features. The one or more multimodal features may be features that are present within the content item. The trained predication model may use one or more multimodal detectors to determine the one or more multimodal features that are present within the content item. The one or more multimodal detectors may be resident on, or other otherwise controlled by, the computing device.

At step 1110, a predicted accessibility score for the content item may be determined. For example, the trained prediction model may determine the predicted accessibility score for the content item. The trained prediction model may determine the predicted accessibility score for the content item based on the one or more multimodal features present within the content item. At step 1112, the predicted accessibility score for the content item may be stored. For example, the computing device and/or the trained prediction model may store the predicted accessibility score for the content item at a server for later use. The stored predicted accessibility score may be used by the computing device, the trained prediction model, or another computing device when other user devices provide indications of a selection of the content item (e.g., by other users). That is, the stored predicted accessibility score may be retrieved in the future rather than requiring the trained prediction model to determine a second predicted accessibility score for the same content item.

At step 1114, the computing device may send the predicted accessibility score. For example, the computing device may send the predicted accessibility score to the user device. The user device may receive the predicted accessibility score. As noted above, the computing device may be a module that is part of the user device. In such an example, the predicted accessibility score sent at step 1114 may be simply sent (e.g., transmitted internally) from the module of the user device referred to herein as the computing device to a module of the user device that may be used to output the predicted accessibility score (e.g., a display module, screen, etc.). The user device may cause the predicted accessibility score to be output. For example, the user device may cause the predicted accessibility score to be output (e.g., displayed) as part of a description of the content item within the program guide. The predicted accessibility score may be output (e.g., displayed) as a percentage (e.g., 85%), a letter rating (e.g., B+), a graphical representation (e.g., 3.5 stars/icons out of 4), an indication of a comparison of the predicted accessibility score against a known, or predicted, accessibility score for another content item (e.g., a comparison of the predicted accessibility score to an accessibility score for a previously viewed content item), a combination thereof, and/or the like. The predicted accessibility score may be provided as an audio message. The audio message may be emitted by the user device. The audio message may provide the predicted accessibility score as a percentage (e.g., "The accessibility score for this movie is 85%"), a letter rating (e.g., "This movie is rated 'B+' for accessibility"), a numerical rating (e.g., "This movie is rated '3.5 stars out of 4' for accessibility"), an indication of a comparison of the predicted accessibility score against a known, or predicted, accessibility score for another content item (e.g., "This movie is rated higher for accessibility than the movie you watched last night"), a combination thereof, and/or the like.

Turning now to FIG. 12, a flowchart of an example method 1200 for improved accessibility scoring for content items is shown. The method 1200 may be performed in whole or in part by a single computing device, a plurality of computing devices, and the like. For example, the server 102, and/or the one or more content sources 103,105 of the system 100 may be configured to perform the method 1200. As another example, the training module 320 or the prediction module 330 of the system 300 may be configured to perform the method 1200. As a further example, the computing device 601 or the server 602 of the system 600 may be configured to perform the method 1200.

At step 1202, a computing device may determine (e.g., receive) an indication of a selection of a video content item. The selection may be made by a user, such as a user at user device. The indication of the selection of the video content item may be an indication of the user scrolling over one or more of a description for the video content item or an identifier for the video content item within a program guide. The program guide may be presented to the user at the user device.

At step 1204, a disability associated with the user may be determined. The disability may be a visual impairment, a hearing impairment, a cognitive impairment, etc. The disability may be determined based on a user profile associated with the user. The user profile may be stored at the user device, at the computing device, and/or accessible by the computing device (e.g., stored in a database accessible by the computing device via a network). The disability may be determined based on an indication of a selection and/or command received at the user device and/or the computing device. For example, the user may interact with a user interface at the user device to indicate the disability.

At step 1206, an accessibility score associated with the video content item may be determined. The accessibility score may be determined based on one or more audio features in the video content item. The one or more audio features may be perceptible to the user with the disability. For example, for a user having a visual impairment, the one or more audio features may include one or more of secondary audio programming (SAP), a number of languages spoken, an amount of dialog, or an indication of a narrator. The accessibility score may be determined based on one or more video features in the video content item. The one or more video features may be perceptible to the user with the disability. For example, for a user having a visual impairment, the one or more video features may include one or more of an amount of on-screen textual features or a number of scenes. As another example, for a user having a hearing impairment, the one or more audio features include one or more of an amount of dialog or a number of characters, and the one or more video features include one or more of an indication of closed-captioning or a scene change rate. The video content may be associated with one or more features indicated by metadata associated with the video content item (e.g., duration, genre, etc.).

Determining the accessibility score for the video content item may be based on a trained model. For example, the trained model may take into account the disability associated with the user as well as the one or more audio features and the one or more video features. The model may be trained according to a training process, such as one or more steps of the method 400 described herein.

At step 1208, an indication of the accessibility score may be output. For example, the computing device may cause the predicted accessibility score to be output at the user device. The user device may cause the predicted accessibility score to be output (e.g., displayed) as part of a description of the content item within a program guide. The predicted accessibility score may be output (e.g., displayed) as a percentage (e.g., 85%), a letter rating (e.g., B+), a graphical representation (e.g., 3.5 stars/icons out of 4), an indication of a comparison of the predicted accessibility score against a known, or predicted, accessibility score for another content item (e.g., a comparison of the predicted accessibility score to an accessibility score for a previously viewed content item), a combination thereof, and/or the like. The predicted accessibility score may be provided as an audio message. The audio message may be emitted by the user device. The audio message may provide the predicted accessibility score as a percentage (e.g., "The accessibility score for this movie is 85%"), a letter rating (e.g., "This movie is rated 'B+' for accessibility"), a numerical rating (e.g., "This movie is rated '3.5 stars out of 4' for accessibility"), an indication of a comparison of the predicted accessibility score against a known, or predicted, accessibility score for another content item (e.g., "This movie is rated higher for accessibility than the movie you watched last night"), a combination thereof, and/or the like.

Turning now to FIG. 13, a flowchart of an example method 1300 for improved accessibility scoring for content items is shown. The method 1300 may be performed in whole or in part by a single computing device, a plurality of computing devices, and the like. For example, the server 102, and/or the one or more content sources 103,105 of the system 100 may be configured to perform the method 1300. As another example, the training module 320 or the prediction module 330 of the system 300 may be configured to perform the method 700. As a further example, the computing device 601 or the server 602 of the system 600 may be configured to perform the method 1300.

At step 1302, a computing device may receive an accessibility score for each of a plurality of video content items. The accessibility score for each of a plurality of video content items may be received from another computing device. At step 1304, the computing device may determine a plurality of multimodal features. The plurality of multimodal features may be determined based on the plurality of content items. The plurality of multimodal features may be determined by the computing device for use in training a prediction model. Each content item of the plurality of content items may comprise one or more of the plurality of multimodal features. The plurality of multimodal features may include video features (e.g., based on video/image analysis), audio features (e.g., based on audio analysis), text-based features (e.g., based on closed-captioning analysis), features indicated by metadata (e.g., duration, genre, etc.), a combination thereof, and/or the like. The computing device may use one or more multimodal detectors to determine the one or more multimodal features that are present within each content item. The one or more multimodal detectors may be resident on, or other otherwise controlled by, the computing device.

At step 1306, the computing device may train the prediction model. For example, the computing device may train the prediction model based on the accessibility score for each of the plurality of video content items and based on the one or more multimodal features associated with each of the plurality of video content items. The prediction model may be trained according to a training process, such as one or more steps of the method 400 described herein. The accessibility scores may be predetermined accessibility scores based on survey scores, review scores, etc., collected from multiple types of viewers of the plurality of content items.

Some, or all of the plurality of video content items may include an audio description track, such as audio related to secondary audio programming (SAP), the American Council of the Blind's Audio Description Project (ADP), and/or the like. The audio description track for a content item may provide narration regarding visual elements of the content item. The predetermined accessibility score for a content item having an audio description track may be based on a usage of the audio description track. For example, the predetermined accessibility score may be based on a ratio (e.g., a percentage, a fraction, etc.) of a quantity of viewers of the content item that enable the audio description track as compared to a quantity of total viewers of the content item. The predetermined accessibility score may be based on a quantity of viewers of the content item that enable the audio description track that meet or exceed a threshold.

The multiple types of viewers may be persons who are visually impaired, persons who are hearing impaired, persons who are cognitively impaired, etc., as well as persons who desire to view content that requires less visual attention and/or audio attention as the case may be. Each of the plurality of multimodal features may differ within each of the plurality of content items. For example, a first content item may include one or more multimodal features that are not present at all—or are present to a lesser degree—within another content item (e.g., a documentary film may have 40% more dialogue than a Sci-Fi film). The predetermined accessibility scores may be used as the "ground truth" regarding which of the plurality of multimodal features are most correlative with a high accessibility score or with a low accessibility score based on the type of viewer. For example, depending on which of the plurality of multimodal features are present within a first content item, the predetermined accessibility score for the first content item provided by a visually impaired person may differ greatly from the predetermined accessibility score for the first video content item provided by a hearing impaired person.

The plurality of multimodal features and the predetermined accessibility score for each of the plurality of content items may be used to train the prediction model. At step 1308, the computing device may output the trained prediction model. For example, the trained prediction model may be output by the computing device and provided to another computing device(s), such a server(s) and/or a user device(s). The trained prediction model may be configured to provide a predicted accessibility score for a further content item (e.g., a video content item). The further content item may be a content item that is not part of the plurality of content items that were used to train the prediction model. The predicted accessibility score for the further content item may indicate how accessible the further content item may be for persons who are visually impaired, hearing impaired, cognitively impaired, etc., as well as for persons who desire to view content that requires less visual attention and/or audio attention as the case may be.

A user of a user device may make a selection of the further content item, such as when browsing content items in a program guide. The user device may send second data to the computing device. The second data may include an indication of the selection of the further content item. The computing device may receive the second data. The computing device may cause the second data to be provided to the trained prediction model. The trained prediction model may retrieve the further content item for analysis (e.g., from a video cache) based on the second data. The trained prediction model may analyze the further content item and determine (e.g., extract) one or more multimodal features of the plurality of multimodal features that are present within the further content item. For example, the trained predication model may use one or more multimodal detectors to determine the one or more multimodal features that are present within the further content item. The trained prediction model may determine a predicted accessibility score for the further content item. For example, the trained prediction model may determine the predicted accessibility score for the further content item based on the one or more multimodal features present within the further content item. The computing device may send the predicted accessibility score. For example, the computing device may send the predicted accessibility score to the user device.

The user device may receive the predicted accessibility score. The user device may cause the predicted accessibility score to be output. For example, the user device may cause the predicted accessibility score to be output (e.g., displayed) as part of a description of the further content item within the program guide. The predicted accessibility score may be output (e.g., displayed) as a percentage (e.g., 85%), a letter rating (e.g., B+), a graphical representation (e.g., 3.5 stars/icons out of 4), an indication of a comparison of the predicted accessibility score against a known, or predicted, accessibility score for another content item (e.g., a comparison of the predicted accessibility score to an accessibility score for a previously viewed content item), a combination thereof, and/or the like. The predicted accessibility score may be provided as an audio message. The audio message may be emitted by the user device. The audio message may provide the predicted accessibility score as a percentage (e.g., "The accessibility score for this movie is 85%"), a letter rating (e.g., "This movie is rated 'B+' for accessibility"), a numerical rating (e.g., "This movie is rated '3.5 stars out of 4' for accessibility"), an indication of a comparison of the predicted accessibility score against a known, or predicted, accessibility score for another content item (e.g., "This movie is rated higher for accessibility than the movie you watched last night"), a combination thereof, and/or the like.

Turning now to FIG. 14, a flowchart of an example method 1400 for improved accessibility scoring for content items is shown. The method 1400 may be performed in whole or in part by a single computing device, a plurality of computing devices, and the like. For example, the server 102, and/or the one or more content sources 103, 105 of the system 100 may be configured to perform the method 1400. As another example, the training module 320 or the prediction module 330 of the system 300 may be configured to perform the method 1400. As a further example, the computing device 601 or the server 602 of the system 600 may be configured to perform the method 1400.

At step 1402, a computing device may determine (e.g., receive) an accessibility score for a video content item. For example, the computing device may determine the accessibility score based on one or more multimodal features associated with the video content item and/or a trained model. The one or more multimodal features may be associated with one or more video features of the video content item, one or more audio features of the video content item, or one or more features indicated by metadata associated with the video content item. For example, the accessibility score may be determined based on the one or more audio features in the video content item. The one or more audio features may be perceptible to a user with a disability. For example, for a user having a visual impairment, the one or more audio features may include one or more of secondary audio programming (SAP), a number of languages spoken, an amount of dialog, or an indication of a narrator. The accessibility score may be determined based on one or more video features in the video content item. The one or more video features may be perceptible to the user with the disability. For example, for a user having a visual impairment, the one or more video features may include one or more of an amount of on-screen textual features or a number of scenes. As another example, for a user having a hearing impairment, the one or more audio features include one or more of an amount of dialog or a number of characters, and the one or more video features include one or more of an indication of closed-captioning or a scene change rate. The video content may be associated with one or more features indicated by metadata associated with the video content item (e.g., duration, genre, etc.).

A user of a user device may select the video content item. At step 1404, an indication of the selection of the video content item may be received. For example, indication of the selection of the video content item may be the sent from the user device to the computing device. The indication of the selection of the video content item may be an indication of the user scrolling over one or more of a description for the video content item or an identifier for the video content item within a program guide. The program guide may be presented to the user at the user device.

A disability associated with the user may be determined. The disability may be a visual impairment, a hearing impairment, a cognitive impairment, etc. The disability may be determined based on a user profile associated with the user. The user profile may be stored at the user device, at the computing device, and/or accessible by the computing device (e.g., stored in a database accessible by the computing device via a network). The disability may be determined based on an indication of a selection and/or command received at the user device and/or the computing device. For example, the user may interact with a user interface at the user device to indicate the disability.

Determining the accessibility score for the video content item may be based on a trained model. For example, the trained model may take into account the disability associated with the user as well as the one or more multimodal features associated with the video content item. The model may be trained according to a training process, such as one or more steps of the method 400 described herein. For example, the computing device may receive first data for training the model. The first data may be received from another computing device. The first data may be associated with a plurality of content items, such as video content items. The first data may comprise an accessibility score for each content item of the plurality of content items. The computing device may determine a plurality of multimodal features associated with the plurality of content items. The computing device may use one or more multimodal detectors to determine the one or more multimodal features that are present within each content item. The one or more multimodal detectors may be resident on, or other otherwise controlled by, the computing device. The computing device may train the model based on the first data and the plurality of multimodal features. As described herein, the first data may comprise an accessibility score for each content item of the plurality of content items. The accessibility scores may be predetermined accessibility scores based on survey scores, review scores, etc., collected from multiple types of viewers of the plurality of content items.

At step 1406, the accessibility score may be output. For example, the computing device may cause the accessibility score to be output at the user device based on the indication of the selection. The user device may cause the accessibility score to be output (e.g., displayed) as part of a description of the content item within a program guide. The predicted accessibility score may be output (e.g., displayed) as a percentage (e.g., 85%), a letter rating (e.g., B+), a graphical representation (e.g., 3.5 stars/icons out of 4), an indication of a comparison of the predicted accessibility score against a known, or predicted, accessibility score for another content item (e.g., a comparison of the predicted accessibility score to an accessibility score for a previously viewed content item), a combination thereof, and/or the like. The predicted accessibility score may be provided as an audio message. The audio message may be emitted by the user device. The audio message may provide the predicted accessibility score as a percentage (e.g., "The accessibility score for this movie is 85%"), a letter rating (e.g., "This movie is rated 'B+' for accessibility"), a numerical rating (e.g., "This movie is rated '3.5 stars out of 4' for accessibility"), an indication of a comparison of the predicted accessibility score against a known, or predicted, accessibility score for another content item (e.g., "This movie is rated higher for accessibility than the movie you watched last night"), a combination thereof, and/or the like.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. An apparatus comprising:
one or more processors; and
memory storing processor executable instructions that, when executed by the one or more processors, cause the apparatus to:
   determine an indication of a selection of a video content item by a user;
   determine a disability associated with the user;
   determine, based on one or more audio features in the video content item being perceptible to the user with the disability or one or more video features in the video content item being perceptible to the user with the disability, an accessibility score associated with the video content item, wherein the one or more audio features comprise an amount of dialog; and
   output an indication of the accessibility score.

2. The apparatus of claim 1, wherein at least one of:
the accessibility score is indicative of a level of perceptibility of the video content item for the user;
the indication of the selection of the video content item comprises an indication of the user scrolling over one or more of a description for the video content item or an identifier for the video content item within a program guide; or
the video content item comprises one or more features indicated by metadata associated with the video content item.

3. The apparatus of claim 1, wherein the processor executable instructions that cause the apparatus to determine the accessibility score for the video content item further cause the apparatus to:
determine, using a trained model, based on the one or more audio features or the one or more video features in the video content item, the accessibility score for the video content item.

4. The apparatus of claim 1, wherein at least one of:
the disability comprises visual impairment, wherein the one or more audio features further comprise one or more of a number of languages spoken or an indication of a narrator, and wherein the one or more video features comprise one or more of an amount of on-screen textual features or a number of scenes; or
the disability comprises hearing impairment, wherein the one or more audio features further comprise a number of characters, and wherein the one or more video features comprise one or more of an indication of closed-captioning or a scene change rate.

5. A non-transitory computer readable medium storing processor executable instructions that, when executed by at least one processor, cause the at least one processor to:
determine an indication of a selection of a video content item by a user;
determine a disability associated with the user;
determine, based on one or more audio features in the video content item being perceptible to the user with the disability or one or more video features in the video content item being perceptible to the user with the disability, an accessibility score associated with the video content item, wherein the one or more audio features comprise an amount of dialog; and
output an indication of the accessibility score.

6. The non-transitory computer readable medium of claim 5, wherein at least one of:
the accessibility score is indicative of a level of perceptibility of the video content item for the user;
the indication of the selection of the video content item comprises an indication of the user scrolling over one or more of a description for the video content item or an identifier for the video content item within a program guide; or
the video content item comprises one or more features indicated by metadata associated with the video content item.

7. The non-transitory computer readable medium of claim 5, wherein the processor executable instructions that cause the at least one processor to determine the accessibility score for the video content item further cause the at least one processor to:
determine, using a trained model, based on the one or more audio features or the one or more video features in the video content item, the accessibility score for the video content item.

8. The non-transitory computer readable medium of claim 5, wherein at least one of:
the disability comprises visual impairment, wherein the one or more audio features further comprise one or more of a number of languages spoken or an indication of a narrator, and wherein the one or more video features comprise one or more of an amount of on-screen textual features or a number of scenes; or
the disability comprises hearing impairment, wherein the one or more audio features further comprise a number of characters, and wherein the one or more video features comprise one or more of an indication of closed-captioning or a scene change rate.

9. A system comprising:
a video content item comprising:
   one or more audio features perceptible to a user with a disability, and
   one or more video features perceptible to the user; and
a computing device configured to:
   determine an indication of a selection of the video content item by the user;
   determine the disability associated with the user;
   determine, based on the one or more audio features in the video content item or the one or more video features in the video content item, an accessibility score associated with the video content item, wherein the one or more audio features comprise an amount of dialog; and
   output an indication of the accessibility score.

10. The system of claim 9, wherein at least one of:
the accessibility score is indicative of a level of perceptibility of the video content item for the user;
the indication of the selection of the video content item comprises an indication of the user scrolling over one or more of a description for the video content item or an identifier for the video content item within a program guide; or
the video content item comprises one or more features indicated by metadata associated with the video content item.

11. The system of claim 9, wherein the computing device is configured to determine the accessibility score for the video content item by:

determining, using a trained model, based on the one or more audio features or the one or more video features in the video content item, the accessibility score for the video content item.

12. The system of claim 9, wherein at least one of:
the disability comprises visual impairment, wherein the one or more audio features further comprise one or more of a number of languages spoken or an indication of a narrator, and wherein the one or more video features comprise one or more of an amount of on-screen textual features or a number of scenes; or
the disability comprises hearing impairment, wherein the one or more audio features further comprise a number of characters, and wherein the one or more video features comprise one or more of an indication of closed-captioning or a scene change rate.

13. An apparatus comprising:
one or more processors; and
memory storing processor executable instructions that, when executed by the one or more processors, cause the apparatus to:
determine, using a trained model, based on one or more multimodal features in a video content item, an accessibility score for the video content item, wherein the one or more multimodal features comprise one or more audio features, and wherein the one or more audio features comprise an amount of dialog;
receive an indication of a selection of the video content item by a user; and
output, based on the indication of the selection, the accessibility score.

14. The apparatus of claim 13, wherein at least one of:
the one or more multimodal features are associated with one or more: video features of the video content item, the one or more audio features, or one or more features indicated by metadata associated with the video content item;
the accessibility score for the video content item is indicative of a level of accessibility of the video content item for the user, wherein the user is one or more of visually impaired or hearing impaired; or
the indication of the selection of the video content item comprises an indication of the user scrolling over one or more of a description for the video content item or an identifier for the video content item within a program guide.

15. The apparatus of claim 13, wherein the processor executable instructions further cause the apparatus to:
receive first data associated with a plurality of video content items, wherein the first data comprises an accessibility score for each video content item of the plurality of video content items;
determine, based on the first data, a plurality of multimodal features, wherein each video content item of the plurality of video content items comprises at least one multimodal feature of the plurality of multimodal features; and
train, based on the first data, the model.

16. The apparatus of claim 13, wherein the one or more multimodal features comprise one or more of: secondary audio programming, a number of languages spoken, an indication of a narrator, an amount of on-screen textual features, a number of scenes, a number of characters, an indication of closed-captioning, or a scene change rate.

17. A non-transitory computer readable medium storing processor executable instructions that, when executed by at least one processor, cause the at least one processor to:
determine, using a trained model, based on one or more multimodal features in a video content item, an accessibility score for the video content item, wherein the one or more multimodal features comprise one or more audio features, and wherein the one or more audio features comprise an amount of dialog;
receive an indication of a selection of the video content item by a user; and
output, based on the indication of the selection, the accessibility score.

18. The non-transitory computer readable medium of claim 17, wherein at least one of:
the one or more multimodal features are associated with one or more: video features of the video content item, the one or more audio features, or one or more features indicated by metadata associated with the video content item;
the accessibility score for the video content item is indicative of a level of accessibility of the video content item for the user, wherein the user is one or more of visually impaired or hearing impaired; or
the indication of the selection of the video content item comprises an indication of the user scrolling over one or more of a description for the video content item or an identifier for the video content item within a program guide.

19. The non-transitory computer readable medium of claim 17, wherein the processor executable instructions further cause the at least one processor to:
receive first data associated with a plurality of video content items, wherein the first data comprises an accessibility score for each video content item of the plurality of video content items;
determine, based on the first data, a plurality of multimodal features, wherein each video content item of the plurality of video content items comprises at least one multimodal feature of the plurality of multimodal features; and
train, based on the first data, the model.

20. The non-transitory computer readable medium of claim 17, wherein the one or more multimodal features comprise one or more of: secondary audio programming, a number of languages spoken, an indication of a narrator, an amount of on-screen textual features, a number of scenes, a number of characters, an indication of closed-captioning, or a scene change rate.

21. A system comprising:
a video content item comprising one or more multimodal features, wherein the one or more multimodal features comprise one or more audio features, and wherein the one or more audio features comprise an amount of dialog;
and
a computing device configured to:
determine, using a trained model, based on the one or more multimodal features in the video content item, an accessibility score for the video content item;
receive an indication of a selection of the video content item by a user; and
output, based on the indication of the selection, the accessibility score.

22. The system of claim 21, wherein at least one of:
the one or more multimodal features are associated with one or more: video features of the video content item, the one or more audio features, or one or more features indicated by metadata associated with the video content item;

the accessibility score for the video content item is indicative of a level of accessibility of the video content item for the user, wherein the user is one or more of visually impaired or hearing impaired; or the indication of the selection of the video content item comprises an indication of the user scrolling over one or more of a description for the video content item or an identifier for the video content item within a program guide.

23. The system of claim 21, wherein the computing device is further configured to:

receive first data associated with a plurality of video content items, wherein the first data comprises an accessibility score for each video content item of the plurality of video content items;

determine, based on the first data, a plurality of multimodal features, wherein each video content item of the plurality of video content items comprises at least one multimodal feature of the plurality of multimodal features; and train, based on the first data, the model.

24. The system of claim 21, wherein the one or more multimodal features comprise one or more of: secondary audio programming, a number of languages spoken, an indication of a narrator, an amount of on-screen textual features, a number of scenes, a number of characters, an indication of closed-captioning, or a scene change rate.

* * * * *